United States Patent
Lyons et al.

(10) Patent No.: US 9,987,818 B2
(45) Date of Patent: Jun. 5, 2018

(54) CENTER-SIDE METHOD OF PRODUCING SUPERHYDROPHOBIC SURFACE

(71) Applicant: Research Foundation of the City University of New York, New York, NY (US)

(72) Inventors: Alan M. Lyons, New Providence, NJ (US); QianFeng Xu, Staten Island, NY (US)

(73) Assignee: Research Foundation of the City University of New York, New York, NY (US)

( * ) Notice: Subject to any disclaimer, the term of this patent is extended or adjusted under 35 U.S.C. 154(b) by 34 days.

(21) Appl. No.: 15/112,307

(22) PCT Filed: Jan. 16, 2015

(86) PCT No.: PCT/US2015/011830
§ 371 (c)(1),
(2) Date: Jul. 18, 2016

(87) PCT Pub. No.: WO2015/109240
PCT Pub. Date: Jul. 23, 2015

(65) Prior Publication Data
US 2016/0332415 A1     Nov. 17, 2016

Related U.S. Application Data

(60) Provisional application No. 61/928,184, filed on Jan. 16, 2014.

(51) Int. Cl.
*B32B 37/00*     (2006.01)
*B32B 38/10*     (2006.01)
(Continued)

(52) U.S. Cl.
CPC ............. *B32B 3/30* (2013.01); *B32B 3/266* (2013.01); *B32B 7/06* (2013.01); *B32B 27/08* (2013.01);
(Continued)

(58) Field of Classification Search
USPC ............................... 156/230, 234, 247, 249
See application file for complete search history.

(56) References Cited

U.S. PATENT DOCUMENTS 4,334,006 A * 6/1982 Kitajima ............. G03F 7/346
                                                430/141
5,110,655 A * 5/1992 Engler .................. A42B 3/061
                                                  2/5
(Continued)

FOREIGN PATENT DOCUMENTS

| CN | 101851069 | 10/2010 |
|----|-----------|---------|
| KR | 100749082 | 8/2007  |

(Continued)

OTHER PUBLICATIONS

Xu, Fabricating Superhydrophobic Polymer Surfaces with Excellent Abrasion REsistance by a Simple Lamination Templating Method; ABS Appl. Mater. Interfaces, 2011, 3, 3508-3514; Jul. 28, 2011.
(Continued)

*Primary Examiner* — Sing P Chan
(74) *Attorney, Agent, or Firm* — Peter J. Mikesell; Schmeiser, Olsen & Watts, LLP

(57) ABSTRACT

A method for forming a superhydrophobic surface is disclosed. A surface of a first substrate is bonded to a surface of a second substrate to form a stacked material. The stacked material is peeled apart to form a fracture line and provide a superhydrophobic surface.

16 Claims, 22 Drawing Sheets

(51) Int. Cl.
  *B32B 3/26* (2006.01)
  *B32B 3/30* (2006.01)
  *B32B 27/08* (2006.01)
  *B32B 27/32* (2006.01)
  *G02B 1/00* (2006.01)
  *B32B 7/06* (2006.01)

(52) U.S. Cl.
  CPC .......... *B32B 27/322* (2013.01); *B32B 37/025* (2013.01); *G02B 1/00* (2013.01); *B32B 2255/10* (2013.01); *B32B 2255/20* (2013.01); *B32B 2307/412* (2013.01); *B32B 2307/416* (2013.01); *B32B 2307/538* (2013.01); *B32B 2307/704* (2013.01); *B32B 2307/73* (2013.01); *B32B 2551/00* (2013.01)

(56) References Cited

U.S. PATENT DOCUMENTS

| | | | |
|---|---|---|---|
| 5,720,739 A * | 2/1998 | Hilston | A61F 13/5622 428/195.1 |
| 6,046,262 A * | 4/2000 | Li | C08J 5/06 523/114 |
| 6,429,157 B1 * | 8/2002 | Kishi | B29C 70/025 442/227 |
| 6,677,258 B2 * | 1/2004 | Carroll | A61F 13/51462 442/394 |
| 7,998,554 B2 | 8/2011 | Wang et al. | |
| 8,240,320 B2 | 8/2012 | Mertins et al. | |
| 8,535,791 B2 | 9/2013 | Dhinojwala et al. | |
| 8,905,078 B2 | 12/2014 | Lee et al. | |
| 9,040,145 B2 | 5/2015 | Lyons et al. | |
| 9,340,922 B2 | 5/2016 | Im et al. | |
| 2002/0006508 A1 * | 1/2002 | Shichiri | B32B 17/10036 428/339 |
| 2002/0019187 A1 * | 2/2002 | Carroll | A61F 13/51462 442/394 |
| 2002/0066473 A1 | 6/2002 | Levy et al. | |
| 2002/0128390 A1 * | 9/2002 | Ellul | C08L 23/10 525/191 |
| 2004/0126766 A1 * | 7/2004 | Amorese | B01L 3/50853 435/6.12 |
| 2004/0142621 A1 * | 7/2004 | Carroll | A61F 13/51462 442/394 |
| 2005/0229328 A1 | 10/2005 | Tran | |
| 2005/0233660 A1 * | 10/2005 | Kimbrell | B32B 27/12 442/76 |
| 2005/0266250 A1 * | 12/2005 | Hayakawa | C03C 17/3411 428/421 |
| 2006/0008618 A1 | 1/2006 | Wang et al. | |
| 2007/0013106 A1 | 1/2007 | Lee et al. | |
| 2007/0044906 A1 * | 3/2007 | Park | B29C 47/0016 156/272.2 |
| 2007/0134477 A1 * | 6/2007 | Bell | B32B 23/08 428/216 |
| 2007/0298216 A1 | 12/2007 | Jing et al. | |
| 2009/0081852 A1 * | 3/2009 | Tanaka | B24B 37/042 438/464 |
| 2009/0246473 A1 | 10/2009 | Lee et al. | |
| 2009/0269560 A1 | 10/2009 | Dhinojwala et al. | |
| 2010/0028615 A1 | 2/2010 | Hwang et al. | |
| 2010/0103763 A1 | 4/2010 | Ponzielli | |
| 2011/0006458 A1 * | 1/2011 | Sagi | A61M 37/0015 264/319 |
| 2011/0143094 A1 | 6/2011 | Kitada et al. | |
| 2012/0315459 A1 * | 12/2012 | Fugetsu | B82Y 30/00 428/299.1 |
| 2013/0142975 A1 * | 6/2013 | Wallace | B32B 1/02 428/36.7 |
| 2013/0230695 A1 | 9/2013 | Sigmund et al. | |
| 2013/0251948 A1 | 9/2013 | Lyons et al. | |
| 2013/0323464 A1 | 12/2013 | Liang et al. | |
| 2014/0011013 A1 | 1/2014 | Jin et al. | |
| 2014/0106127 A1 | 4/2014 | Lyons et al. | |
| 2014/0264167 A1 | 9/2014 | Solovyov et al. | |
| 2014/0295642 A1 * | 10/2014 | Fournel | H01L 21/187 438/458 |
| 2014/0314982 A1 * | 10/2014 | Paxson | B05D 5/08 428/35.7 |
| 2014/0343170 A1 | 11/2014 | Sugiyama et al. | |
| 2016/0046104 A1 * | 2/2016 | Grah | B32B 27/32 428/215 |
| 2016/0089858 A1 * | 3/2016 | Swanson | B32B 7/06 156/247 |
| 2017/0210627 A1 * | 7/2017 | Jayasinghe | C01B 31/0253 |
| 2017/0341355 A1 * | 11/2017 | Peiffer | B32B 27/36 |

FOREIGN PATENT DOCUMENTS

| | | |
|---|---|---|
| WO | WO2001005574 | 1/2001 |
| WO | WO2012118805 | 9/2012 |
| WO | WO2013094298 | 6/2013 |

OTHER PUBLICATIONS

Karunakaran; Highly Transparent Superhydrophobic Surfaces from the Coassembly of Nanoparticles; Langmuir 2011; 27, 4594-4602; Feb. 28, 2011.

Xu, Organic-Inorganic Composite Nanocoatings with Superhydrophobicity, Good Transparency, and Thermal Stability; Acsnano.org; v 4, No. 4, 2201-2209, 2010.

Xu, Superhydrophobic and transparent coatings based on removable polymeric spheres, J. of Materials Chemistry, 19, 655-660, 2009.

Xu, Transparent, Superhydrophobic Surfaces from One-Step Spin Coating of Hydrophobic Nanoparticles; ACS Appl. Mater. Interfaces, 4, 1118-1125, Jan. 31, 2012.

Ebert, Transparent, Superhydrophobic, and Wear-REsistant Coatings on Glass and Polymer Substrates Using SiO2, ZnO and ITO nanoparticles; Langmuir, 28, 11391-11399; Jul. 5, 2012.

Quere; Wetting and Roughness, Annu. Rev. Mater. Res. 2008:38:71-99; Jul. 9, 2008.

Lim et al.; UV-Driven Reversible Switching of a Roselike Vanadium Oxide Film between Superhydrophobicity and Superhydrophilicity; JACS Communications; Mar. 15, 2007; pp. 4128-4129; vol. 129.

Zhang, X. et al.; Preparation and Photocatalytic Wettability Conversion of TiO2-Based Superhydrophobic Surfaces; Langmuir; Oct. 13, 2006, 22, pp. 9477-9479; American Chemical Society.

Blossey, R.; Self-cleaning surfaces-virtual realities; nature materials; May 2003; pp. 301-306; vol. 2; Nature Publishing Group.

KIPO (ISA/KR), International Search Report (ISR) from corresponding PCT/priority application No. PCT/US2012/026942 as completed Sep. 27, 2012 (total 3 pages).

Caputo, G et al.; Reversibly Light-Switchable Wettability of Hybrid Organic/Inorganic Surfaces With Dual Micro-/Nanoscale Roughness; Adv. Funct. Mater.; Mar. 9, 2009; pp. 1149-1157; vol. 19; Wiley-VCH Verlag GmbH & Co. KGaA, Weinheim.

Jin, Ren-Hua et al., "Biomimetically Controlled Formation of Nanotextured Silica/Titania Films on Arbitrary Substrates and Their Tunable Surface Function", Adv. Mater. 2009, 21, DOI: 10.1002/adma.200803393, pp. 3750-3753.

Feng, Xinjian et al., "The Fabrication and Switchable Superhydrophobicity of TiO2 Nanorod Films", Angew. Chem. Int. Ed. 2005, 44, DOI: 10.1002/anie.200501337, pp. 5115-5118.

ISA/US; ISR/Written Opinion for PCT/US15/21785; dated Dec. 11, 2015; US.

ISA/US; ISR/Written Opinion for PCT/US15/11830; dated May 11, 2015; US.

EPO; Extended European Search Report dated Aug. 29, 2017 in European Application 15737453.9.

* cited by examiner

FIG. 13B
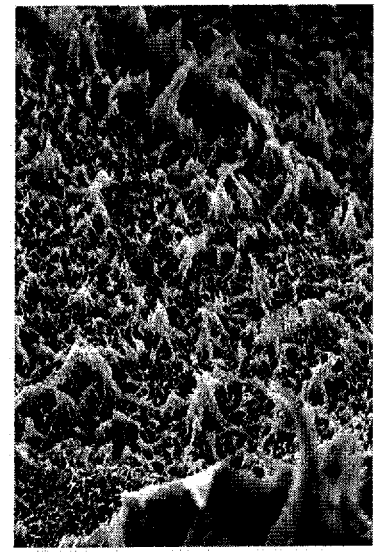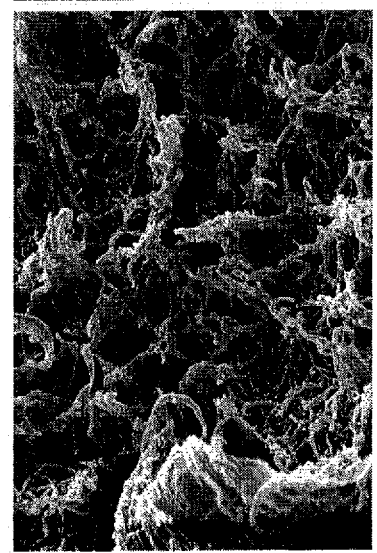
FIG. 13D
FIG. 13A
FIG. 13C

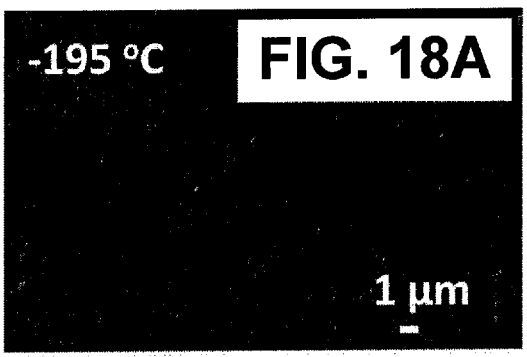
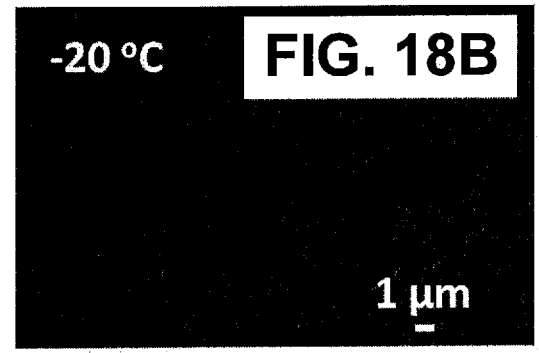
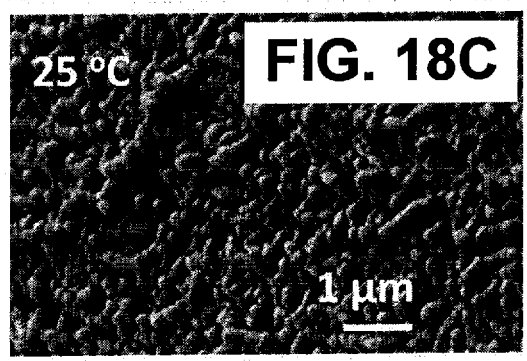
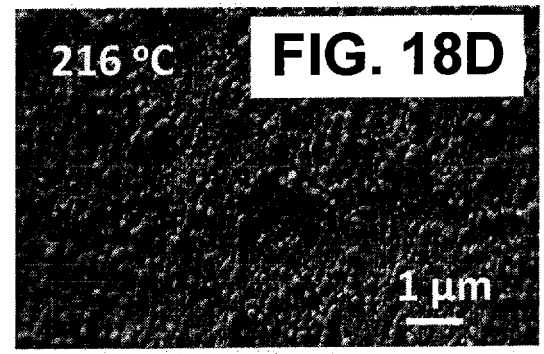
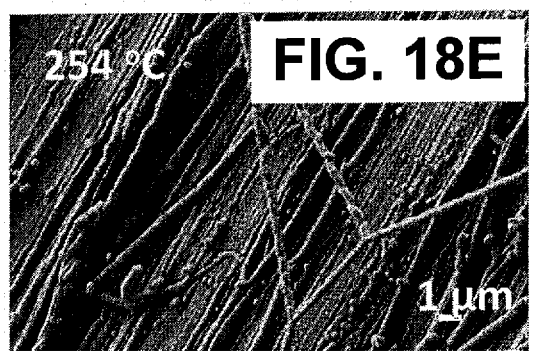
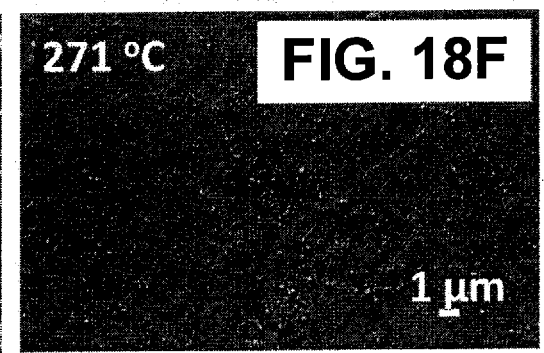

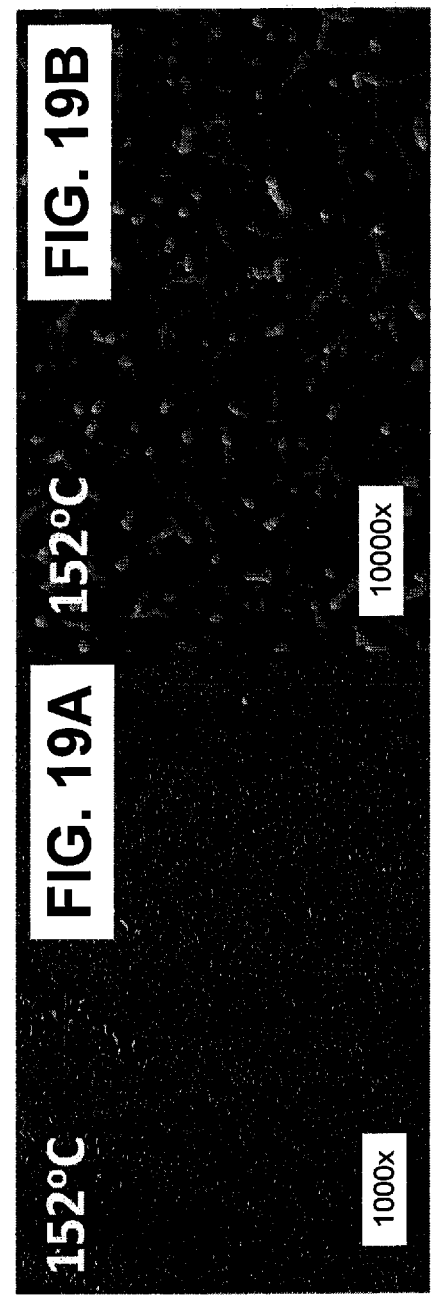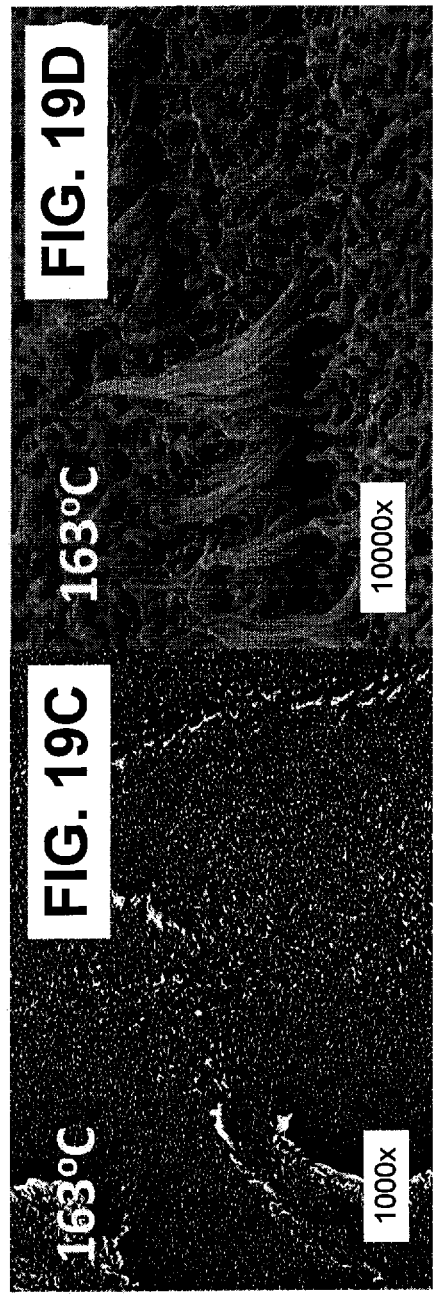

CENTER-SIDE METHOD OF PRODUCING SUPERHYDROPHOBIC SURFACE

CROSS-REFERENCE TO RELATED APPLICATIONS

This application claims priority to and the benefit of U.S. provisional patent application Ser. No. 61/928,184 (filed Jan. 16, 2014) which application is incorporated herein by reference in its entirety.

STATEMENT OF FEDERALLY SPONSORED RESEARCH OR DEVELOPMENT

This invention was made with Government support under grant number 1330949 awarded by the National Science Foundation (NSF). The government has certain rights in the invention.

FIELD OF THE INVENTION

This invention relates to a method of forming a superhydrophobic surface. In one embodiment, the method uses sequential bonding and peeling steps to form the superhydrophobic surface along a fracture line.

BACKGROUND

Polymer films possessing multi-functional properties, such as transparency, anti-reflectivity, superhydrophobicity and self-cleaning properties, have many important applications ranging from small digital micro-fluid devices and precise optical components to large implementations such as display screen, solar panels and building materials. Generally transparency and superhydrophocity are two competitive properties. Superhydrophobicity and the derived self-cleaning properties use hierarchical fine structures with high surface roughness. However, the high roughness can cause significant light scattering that reduces transparency. By controlling the surface roughness to be less than 100 nm and maintaining a high ratio of air to solid interface, superhydrophobicity and transparency in the visible region of the spectrum can be simultaneously achieved. Additionally, in order to simultaneously implement anti-reflective (AR) properties in visible region of the spectrum using surface structures, one must ensure the nanopores on the surface are smaller than the wavelength and arranged in a gradient distribution so that the refractive index of the surface varies gradually from the bulk material to air.

Techniques to prepare such advanced multi-functional surfaces typically involves multisteps, expensive equipment, releasing of toxic chemicals and are limited to small and flat areas. Developing new methods that are low-cost, environmental friendly and compatible with industrial roll-to-roll manufacturing processes to make such multifunctional surfaces would be industrially significant.

Generally, micro/nanofabrication techniques can be divided into two strategies: top-down and bottom-up as shown in FIG. 1A and FIG. 1B, respectively. The top-down method of FIG. 1A, typically utilize specific nanofabrication equipment to etch unprotected materials to create the expected micro or nanoscaled structures. Various lithography methods and other wet or dry etching methods are typical examples of methods used for the top-down strategy. These top-down methods require expensive process tools, are limited to small size samples and can waste valuable materials during etching. Bottom-up methods, such as the method illustrated in FIG. 1B, often involve methods that directly grow, deposit or assemble nanoscale materials such as nanoparticles, fibers or tubes onto substrates. One significant problem with the bottom-up methods is that organic solvents or noxious and expensive chemicals are used, wasted and subsequently released into environment during the fabrication process. Sample size and throughput is typically limited to small samples. Therefore, an improved method is desired.

SUMMARY OF THE INVENTION

A method for forming a superhydrophobic surface is disclosed. A surface of a first substrate is bonded to a surface of a second substrate to form a stacked material. The stacked material is peeled apart to form a fracture line and provide a superhydrophobic surface.

In a first embodiment, a method for forming a superhydrophobic surface is provided. The method comprises steps of laminating a first surface of a first substrate to a second surface of a second substrate to form a stacked material, wherein the first surface comprises a semi-crystalline thermoplastic material having a first melting point; and peeling the first substrate and the second substrate apart to form a fracture line, the fracture line providing a superhydrophobic surface with a water contact angle greater than 130°.

In a second embodiment, a method for forming a superhydrophobic surface is provided. The method comprises steps of laminating a first surface of a first substrate to a glass surface of a glass substrate to form a stacked material, wherein the first surface comprises semi-crystalline thermoplastic material having a first melting point; and peeling the first substrate and the glass substrate apart to form a fracture line, the fracture line providing a superhydrophobic surface on the glass substrate, the superhydrophobic surface having a water contact angle greater than 130°.

In a third embodiment, a substrate with a superhydrophobic surface is provided. The substrate comprises a layer of semi-crystalline thermoplastic material that is disposed on a surface of the substrate, the layer of semi-crystalline thermoplastic material comprising a plurality of filaments extending from the surface, the superhydrophobic surface having a water contact angle greater than 130° and also has anti-reflective properties with a light transmission greater than the surface of the substrate.

BRIEF DESCRIPTION OF THE DRAWINGS

The present invention is disclosed with reference to the accompanying drawings, wherein:

FIG. 13A to 13D are SEM images of a fabricated surface;

FIG. 18A and FIG. 18B are SEM images of surfaces formed by peeling temperatures less than 25° C. that have no superhydrophobicity or anti-reflective properties;

FIG. 18C and FIG. 18D are SEM images of surfaces formed by peeling temperatures between 25° C. and 216° C. that have good superhydrophobicity and anti-reflective properties;

FIG. 18E and FIG. 18F are SEM images of surfaces formed by peeling temperatures above 250° C. for a thermoplastic material with a melting point of about 260° C. that have no superhydrophobicity and no significant anti-reflective properties;

FIG. 19A and FIG. 19B are SEM images of surfaces formed by peeling at 152° C. at 1000× and 10,000×, respectively;

FIGS. 19C and 19D are SEM images of surfaces formed by peeling at 163° C. at 1000× and 10,000×, respectively;

Corresponding reference characters indicate corresponding parts throughout the several views. The examples set out herein illustrate several embodiments of the invention but should not be construed as limiting the scope of the invention in any manner.

DETAILED DESCRIPTION

Disclosed in this specification is a center-side method for fabricating fine structures to create surfaces with multifunctional properties, e.g. superhydrophobicity, self-cleaning, anti-icing, anti-biofouling, transparency and so on. Different from the traditional top-down and bottom-up strategies, the center-side strategy shown in FIG. 2 forms fine structures at the interface between two materials bonded together. Significant advantages of this strategy over the traditional top-down and bottom-up strategies include, but are not limited to, 1) environmental compatibility as solvent may be omitted and wasted material is minimized or eliminated during processing, 2) the size of resulting fine structures could range from tens of nanometers to hundreds of micrometers during realignment of molecules that occurs during peeling and stretching, 3) the cost for protection of fine structures and the related functional properties during packaging, transportation and installation are minimized or even eliminated if the fabrication of fine structures is designed to be the last step. The disclosed method provides both a novel material that comprises a unique set of fine structures and properties as well as a novel method to fabricate the material by controlling the realignment of molecules during peeling apart two films of material bonded together.

Figure 1A:
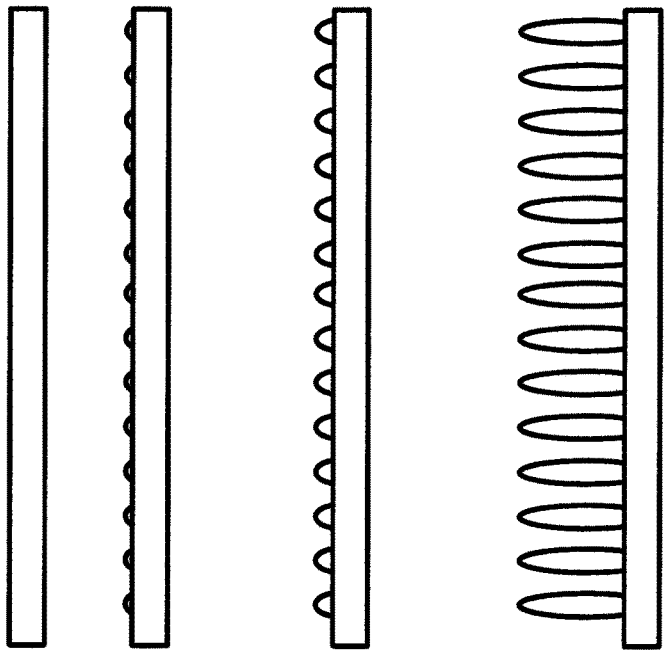
FIG. 1A and FIG. 1B are schematic depictions of a top-down and bottom-up method for forming a fabricated surface.
Figure 1B:
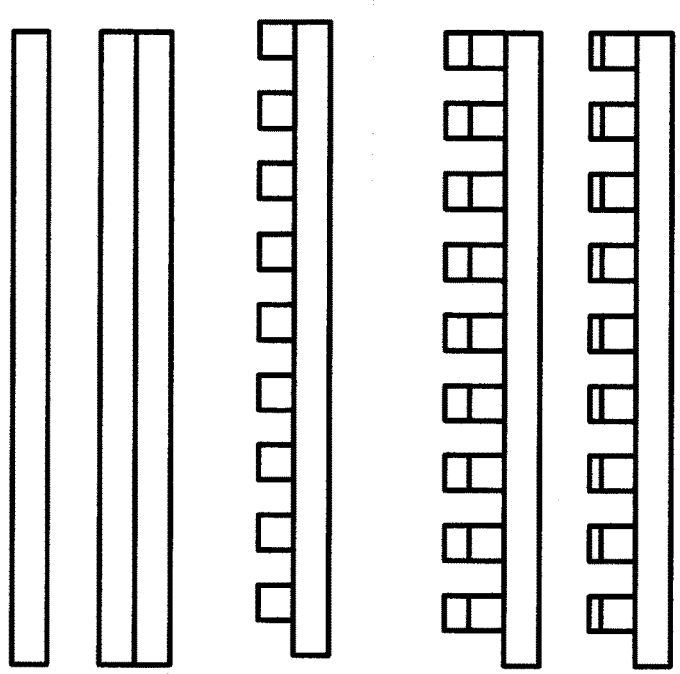
Figure 2:
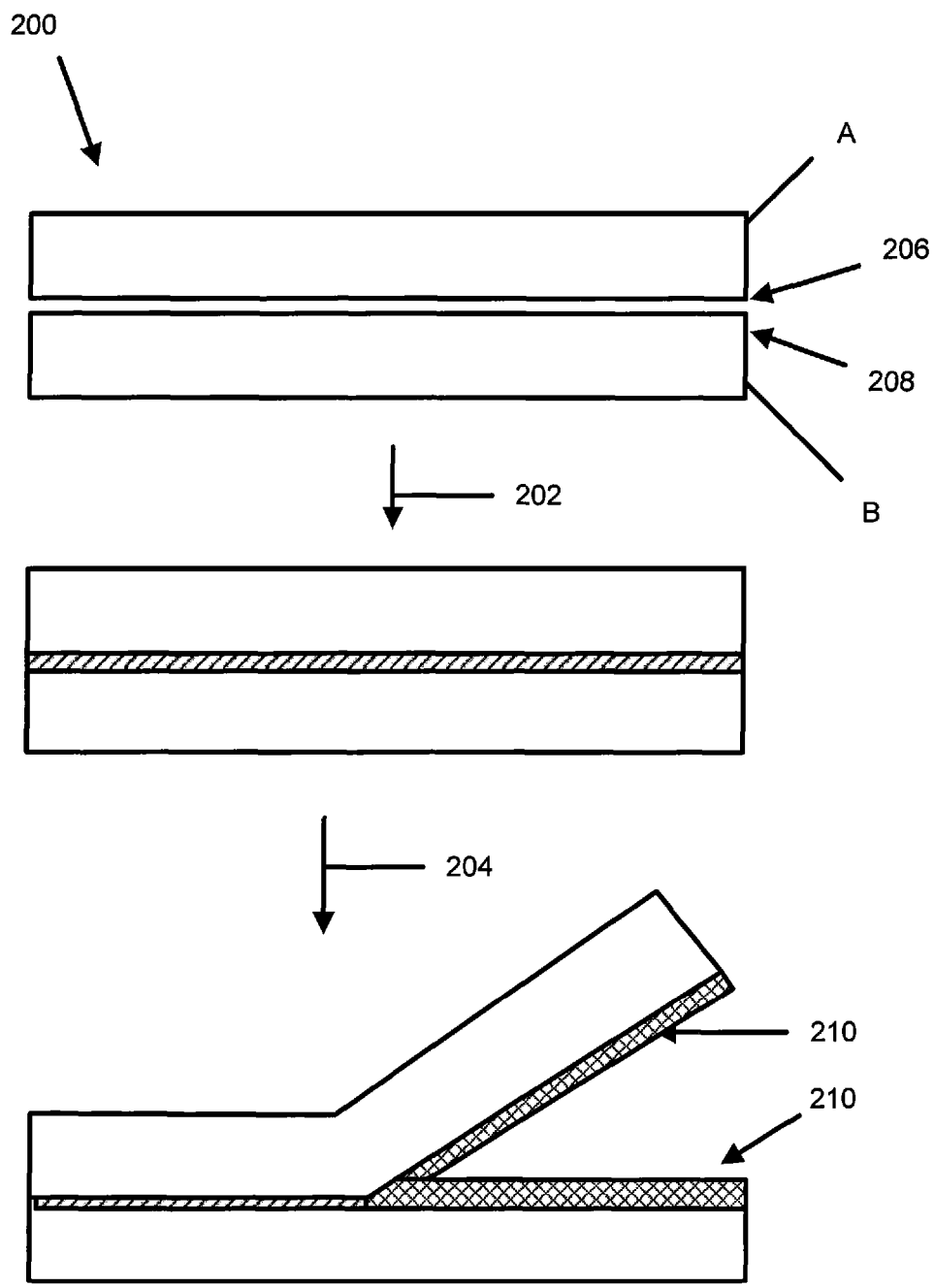
FIG. 2 is a schematic depiction of a center-side method for forming a fabricated surface.

As shown in FIG. 2, an exemplary method 200 comprises two steps. In step 202 two surfaces 206 and 208 of substrates A and B, respectively, are bonded together to produce a stacked material. Step 202 may be performed, for example, by lamination. In step 204, the stacked material is peeled apart to expose a fine structured surface 210 that provides customized properties. In the step 204, molecules (or atoms) at the fracture surface realign along the direction of the peeling force until the molecules either break or pull-out completely from the opposing surface. By selecting appropriate materials as well as controlling the peeling parameters (such as peeling speed, angle and temperature) the realignment of molecules at the fracture surface is controlled to form desired fine structures. The thickness of the substrates is another parameter that can affect the fine structures and properties. For example, for achieving both good transparency and superhydrophobic surfaces, the thickness of substrate B may be between 5 urn to 100 micrometers.

During peeling, molecules or atoms of the materials are realigned under tension to form fine structures. The feature size as well as the aspect ratio of the fine structures fabricated by peeling are affected by the peeling speed, peeling angle, peeling temperature as well as the plasticity, elasticity, crystallinity and molecular weight of the selected materials. The feature size could range from molecular level, a fraction of nanometer, to hundreds of microns. In one embodiment, the aspect ratio (height:width) of the features may range from 1:1 to above 100:1. In another embodiment, the aspect ratio ranges from 10:1 to 100:1 with a height of at least 100 nanometers. An aspect ratio of 1:1 to 10:1 generally gives moderate superhydrophobicity (e.g. a contact angle of greater than 130° C.) and high durability. In one embodiment, the aspect ratio is between 1:1 and 10:1. In another embodiment, the aspect ratio is between 3:1 and 10:1. An aspect ratio greater than 10:1 generally gives high superhydrophobicity (e.g. a contact angle of greater than 150° C.) and moderate durability. In one embodiment, the aspect ratio is between 10:1 and 100:1.

Figure 3:
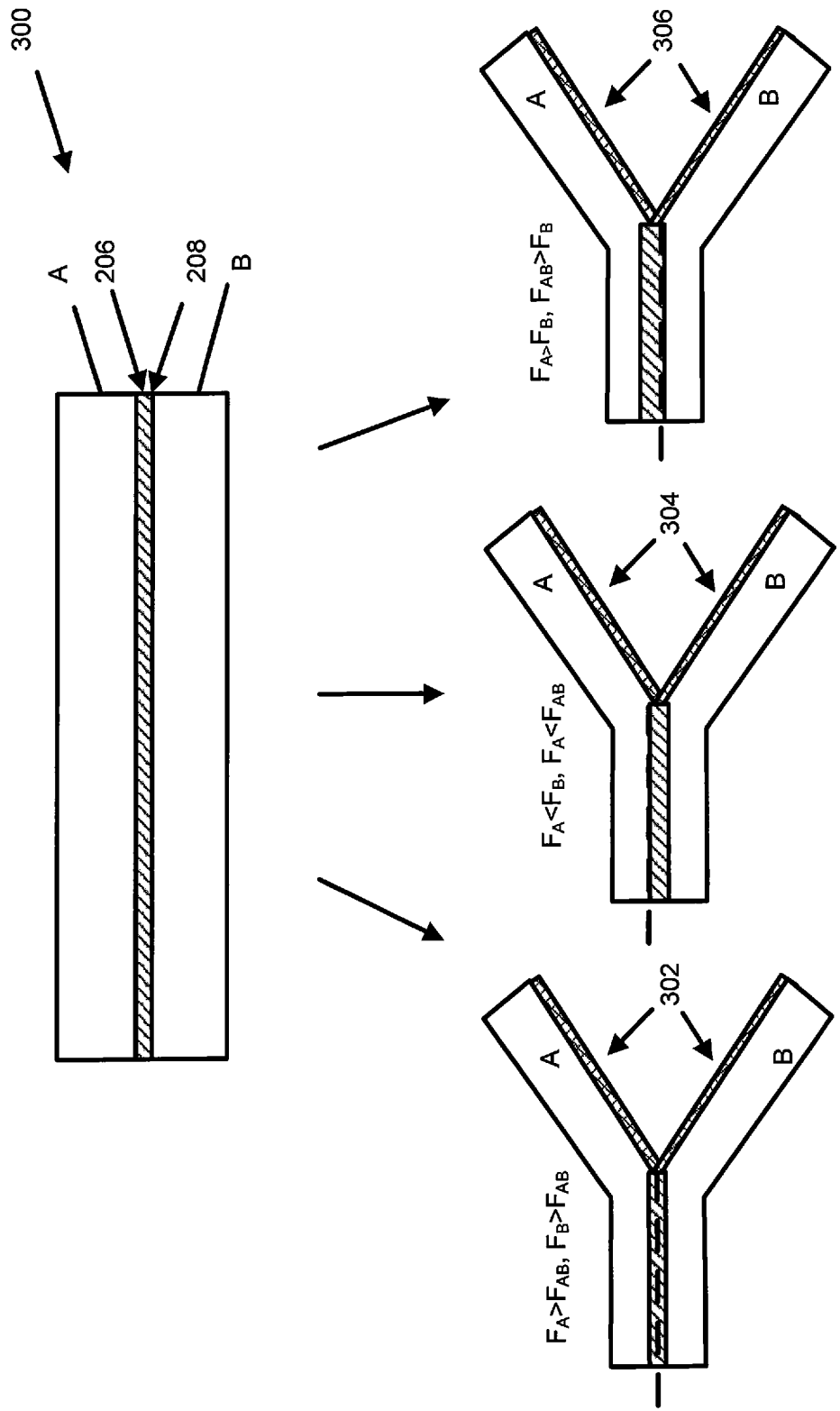
FIG. 3 a schematic depiction of various fracture locations that may occur during the center-side method.

As shown in FIG. 3, fracture is most likely to occur at locations where the adhesion force is the weakest. The fracture of a stacked material 300 may occur at the interface between surface 206 of substrate A and surface 208 of substrate B or within substrate A or substrate B, depending upon the relative strength of the adhesion forces at the interface ($F_{AB}$) and the intermolecular attractive force of substrate A ($F_A$) and substrate B ($F_B$). The fracture surface coincides with the interface of substrate A and substrate B to form a fabricated surface 302 when $F_{AB}$ is less than both $F_A$ and $F_B$. The fracture surface is within substrate A to form a fabricated surface 304 when $F_A$ is less than both $F_B$ and $F_{AB}$. The fracture surface is within substrate B to form a fabricated surface 306 when $F_B$ is less than both $F_A$ and $F_{AB}$. In the latter two cases, the interfacial forces ($F_{AB}$) does not need to be the greatest force, it only need to be greater than the cohesive forces of substrate A or substrate B. The peeling speed and angle can also play important role in determining the dimensions as well as aspect ratio of the obtained fine structures on the fracture surface. The $F_A$, $F_B$ and $F_{AB}$ are impacted by the peeling temperature, the cooling rate, the melting point of the materials, the molecular weight of the thermal plastic polymer, the rigidness of the substrates, as well as the interface geometry and chemistry. The peeling temperature can have a significant effect. In one experiment, the FEP-PTFE film was peeled in liquid nitrogen (−195° C.), and the resulting fabricated surface was not superhydrophobic.

In one embodiment, the peeling temperature is above 25° C. and below crystalline melt temperature of one of the materials but is warm enough to lower the modulus of the material relative to the modulus at room temperature (25° C.). For example, FEP was peeled from glass at 277° C., which is above the melting point of FEP. The surface did not form sufficient nanofibers to generate superhydrophobicity. Accordingly, the peeling temperature was set to be lower than the melting point of the polymer. During the peeling, the crystals grow under stretch. The growth of the crystals during peeling can be controlled by controlling the peeling temperature. In one embodiment, the peeling temperature is above 50° C. and below the crystalline melt temperature of the thermoplastic material. In another embodiment, the peeling temperature is above 100° C. and below the crystalline melt temperature of the thermoplastic material.

The cooling rate after lamination can also have an effect. In one experiment, FEP was applied onto a glass substrates, and if the resign is cooled too slowly (such as cooled with the hot plates) the polymer will form large crystals and generate cracks and defects. A high cooling rate (such as cooling under air blow or contacting cool metal rolls) is preferred for forming fine crystals, which is desirable for concurrently achieving superhydrophobicity and antireflectivity.

The disclosed method is applicable to any two materials that can be bonded together. Suitable materials include glass, metals, alloys, ceramics, polymers, fabrics, wood and composites, which can be bonded together and subsequently separated by peeling. In one embodiment, the substrate is a rigid substrate with a Young's modulus greater than 1 GPa. In another embodiment, the rigid substrate has a Young's modulus greater than 10 GPa. In another embodiment, the rigid substrate is transparent. In one embodiment, the material is a rigid glass substrate that, after treating to become superhydrophobic, is disposed over a photovoltaic cell. In such an embodiment, the resulting coating is rigid, antireflective, superhydrophobic and transparent. In another embodiment, the material is a flexible substrate that forms part of a roofing tile. In such an embodiment, the resulting coating is flexible, superhydrophobic and transparent and may also be anti-reflective.

In one embodiment, one of the two substrates is a thermoplastic material, thermoplastic polymer-based composite or any complex material system that has a thermoplastic surface. In such embodiments, the peeling force is relatively small and the obtained aspect ratio is relatively high. Thermoplastic materials are particularly suitable because such materials 1) are easily bonded to other materials by heating and/or lamination, 2) may be stretched and break apart easily at a relatively low temperature, 3) may be peeling apart at a lower peeling force compared to thermoset or other materials, 4) may form fine structures with high aspect ratios. One advantage of thermoplastic materials is that thermoplastic materials are composed of individual polymer chains whereas other types of polymers, such as thermoset polymers, are composed of crosslinked systems where individual chains are bound together. Examples of thermoplastic materials include Acrylonitrile butadiene styrene (ABS), Acrylic (PMMA) Fluoropolymers (e.g. PTFE, alongside with FEP, PFA, CTFE, ECTFE, ETFE, Polyvinylidene fluoride (PVDF) and THV), Polycarbonate (PC), Polyimide (PI), Polypropylene (PP), Polyethylene (PE), Polyvinyl chloride (PVC), Polyethylene terephthalate (PET), Polystyrene (PS), and the like, provided the thermoplastic material has a crystalline melting point. ABS, PMMA, PVC and PS are typically considered amorphous. A semi-crystalline thermoplastic material is material that comprises crystalline domains and amorphous domains where at least 1% of the polymer is in the crystalline form as determined prior to lamination. In one embodiment, at least 5% of the polymer is in the crystalline form. In another embodiment, at least 10% of the polymer is in the crystalline form. In yet another embodiment, at least 30% of the polymer is in the crystalline form. After the peeling step, the percentage of crystallinity of the material forming the superhydrophobic surfaces increases by at least 5%. For example, when the polymer is 30% crystalline prior to lamination, the superhydrophobic surfaces has a percent crystallinity of at least 31.5%.

Many fabricated surfaces could be derived according to the disclosed method. Exemplary embodiments are described in detail throughout this disclosure. These embodiments can be combined together to constitute new designs for fabricating complicated structures and shapes that can be combined into devices. In one embodiment, at least one of the substrates is flexible. In one such embodiment, at least one substrate is flexible and another substrate is rigid. In another such embodiment, at least two substrate are flexible. Additional embodiments would also be apparent to those skilled in the art after benefiting from reading this disclosure.

Figure 4:
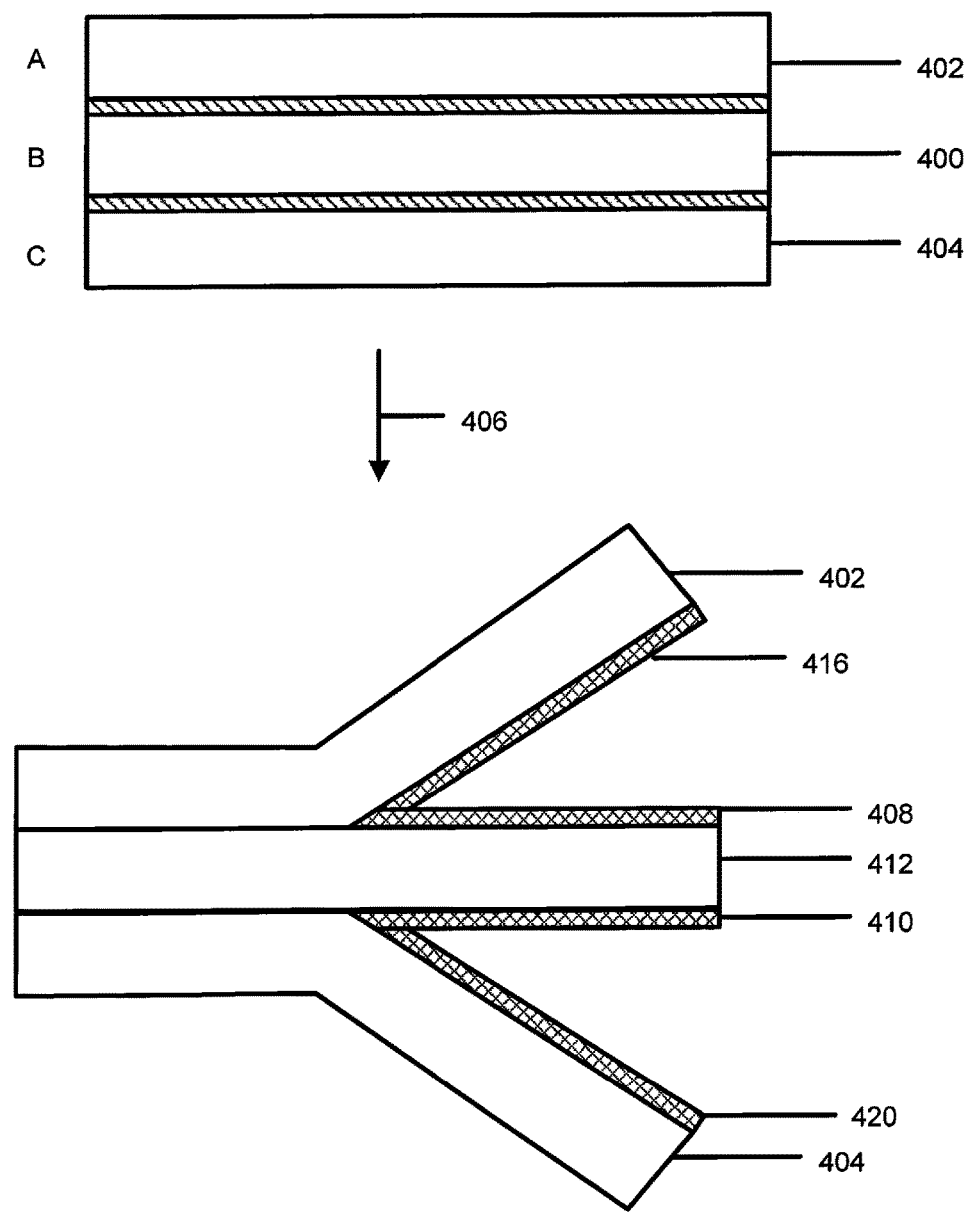
FIG. 4 is a schematic depiction of a center-side method for forming a two-sided substrate with fabricated surfaces.

As shown in FIG. 4, fabricating fine structures on two sides of a single substrate can be done by bonding appropriate peeling substrates on both sides of the single substrate, and then peeling the peeling substrates off. In FIG. 4, a first substrate 400 is bonded to a surface of a second substrate 402 and a surface of a third substrate 404 on opposite surfaces of the first substrate 400. In step 406, a first fracture surface 408 and a second fracture surface 410 are formed to provide a substrate 412 with fracture surfaces on opposing sides. The second substrate 402 may be the same or different than the third substrate 404. The first fracture surface 408 may be the same or different than the second fracture surface 410. In step 406, the formation of the first fracture surface 408 and the second fracture surface 410 may occur simultaneously (e.g. peeling is simultaneous) or sequentially (e.g. peeling of each surface is sequential). In the embodiment of FIG. 3, the second substrate 402 forms a third fractured surface 416 and the third substrate 404 forms a fourth fractured surface 420. The second substrate 402 and/or third substrate 404 may be utilized in a product or discarded as a disposable peeling substrate.

Figure 5:
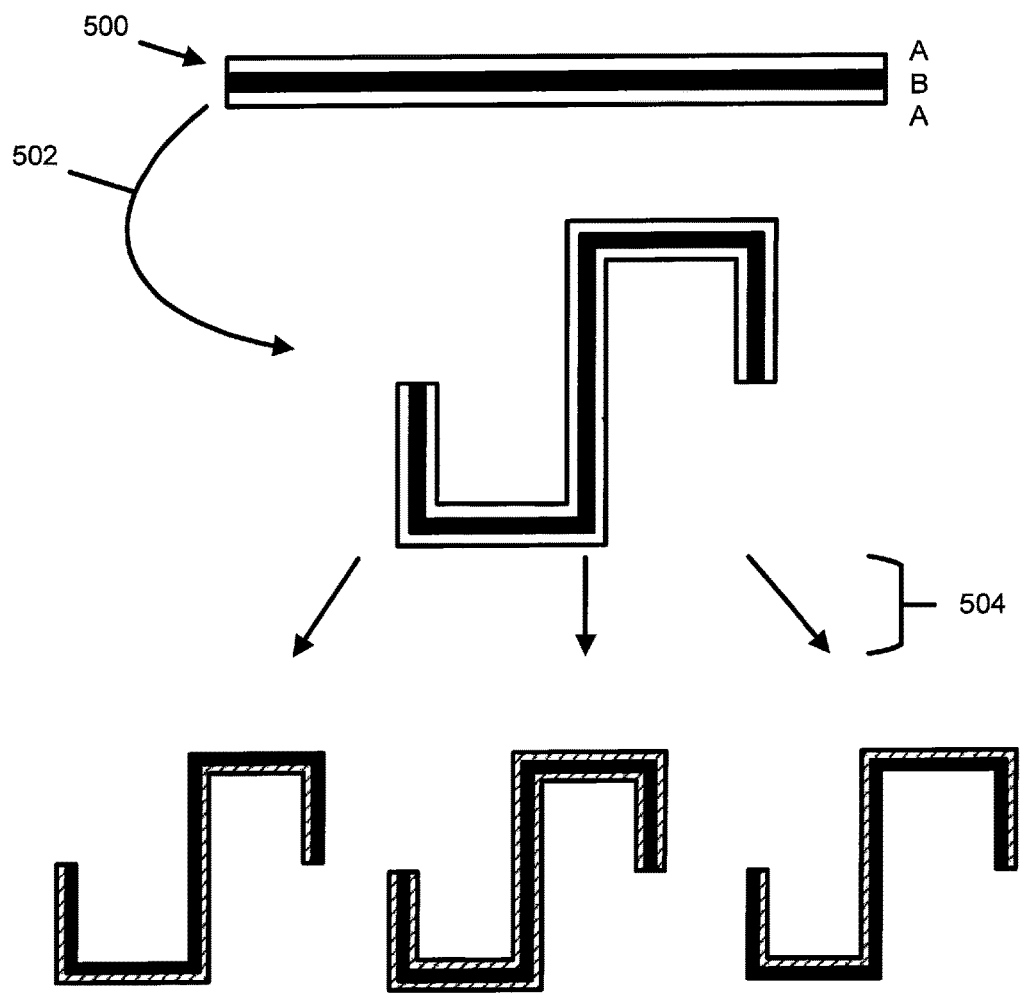
FIG. 5 is a schematic depiction of a center-side method for constructing a substrate with a non-planar shape.

As shown in the embodiment of FIG. 5, the method can be also used for constructing fine structures for substrates with complex shapes. The stacked material 500 of FIG. 5 comprises three substrates bonded together forming a planar stack. In other embodiments, a different number of substrates (e.g. two substrates) are present. In step 502 the stacked material 500 is deformed into a non-planar shape. In step 504 the bonded layers are peeled to fabricate fine structures onto one or two sides of the complex substrate. As shown in step 504, the fractured surface may be formed on a back surface, a front surface, or on both the back surface and the front surface, depending on which surface(s) is(are) subjected to peeling. A significant advantage of this method is that the fine structures can be fabricated in the last step of manufacture and/or installation procedures just before end use. Therefore, the cost for protecting the fine structures during packaging, transportation and installation are minimized or even eliminated.

Figure 6:
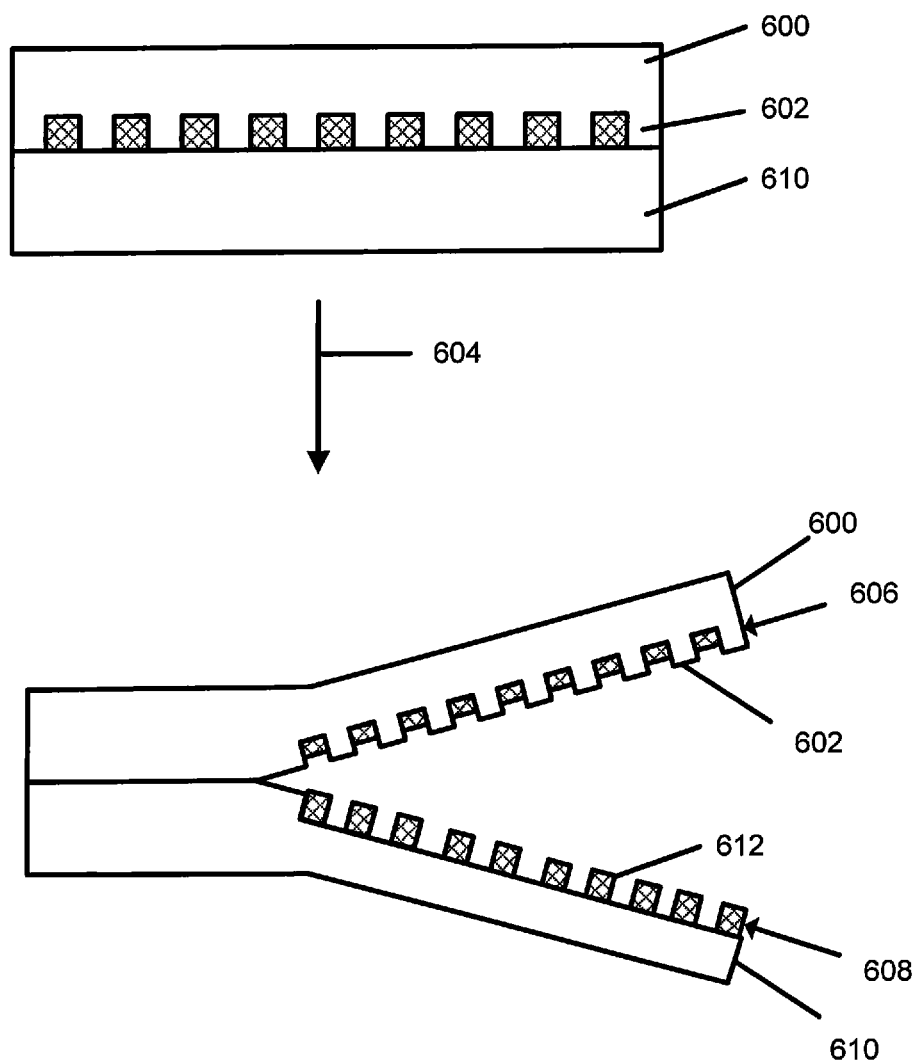
FIG. 6 is a schematic depiction of a center-side method for forming a fabricated surface with a regular pattern.
Figure 7:
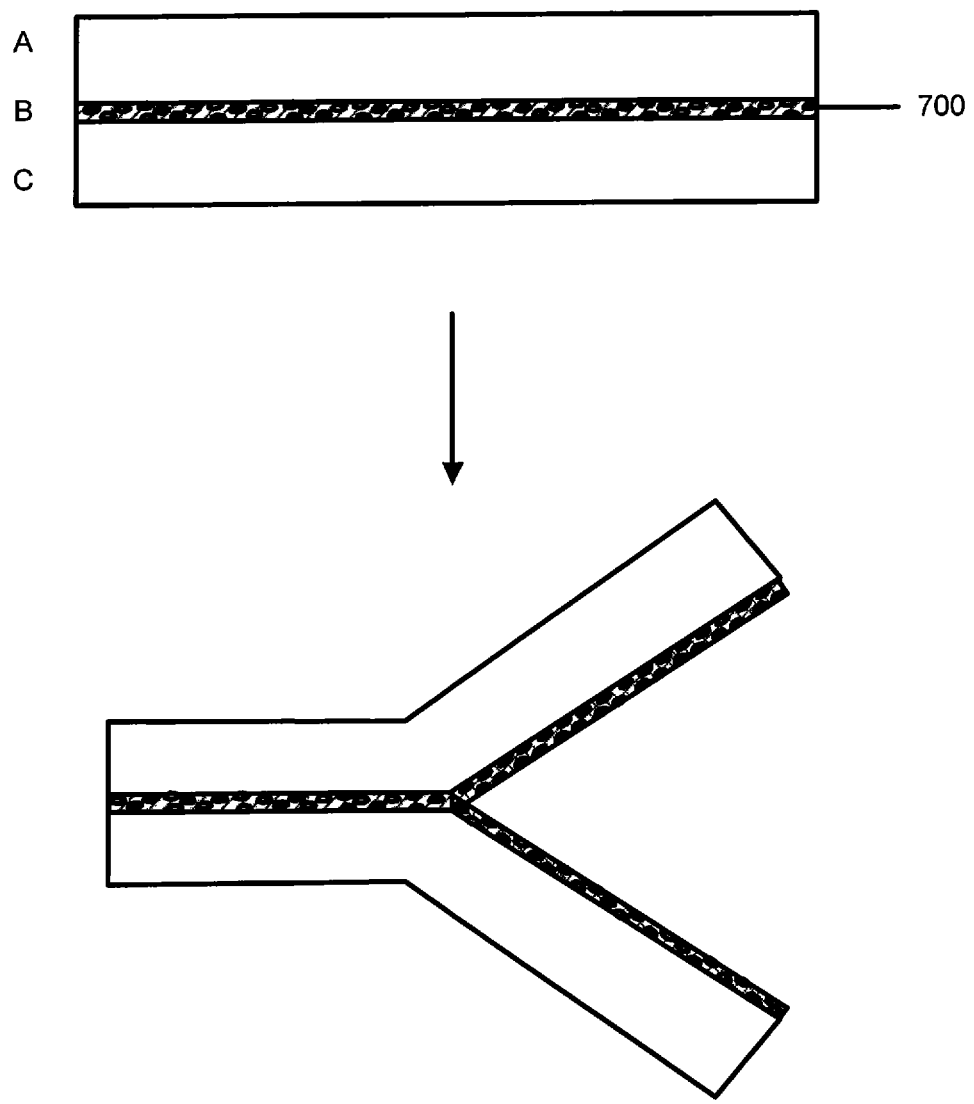
FIG. 7 is a schematic depiction of a center-side method for forming a fabricated surface with an irregular pattern.

FIG. 6 and FIG. 7 depict a method for fabricating ordered or disordered fine structure using regular or irregular patterns. The bonding area at the interface can be altered by the patterns. In the embodiment of FIG. 6, the substrate 600 comprises a pattern 602 at the interface of the substrate 600 and a substrate 610. During a peeling step 604, a first fracture surface 606 is formed on substrate 600 wherein the first fracture surface 606 comprises the pattern 602. A second fracture surface 608 is formed on the material 610 that has a pattern 612 is a negative image of the pattern 602. Regular patterns can be generated by printing, templating, lithography, self-assembly, punching or other techniques. Irregular patterns, including random patterns, (see FIG. 7) can be made by depositing nanomaterials 700 (e.g. nanoparticles, including silica, alumina, etc.) via spraying, dipping, spinning and other techniques on a surface of one of the substrates. The pattern parameters, such as pitch, width, depth, shape and alignment for the regular patterns and the thickness, porosity and morphology of the randomly deposited nanomaterials for the irregular patterns, could also have a significant effect on the formed structures and thus the obtained properties of the surface.

Figure 8:
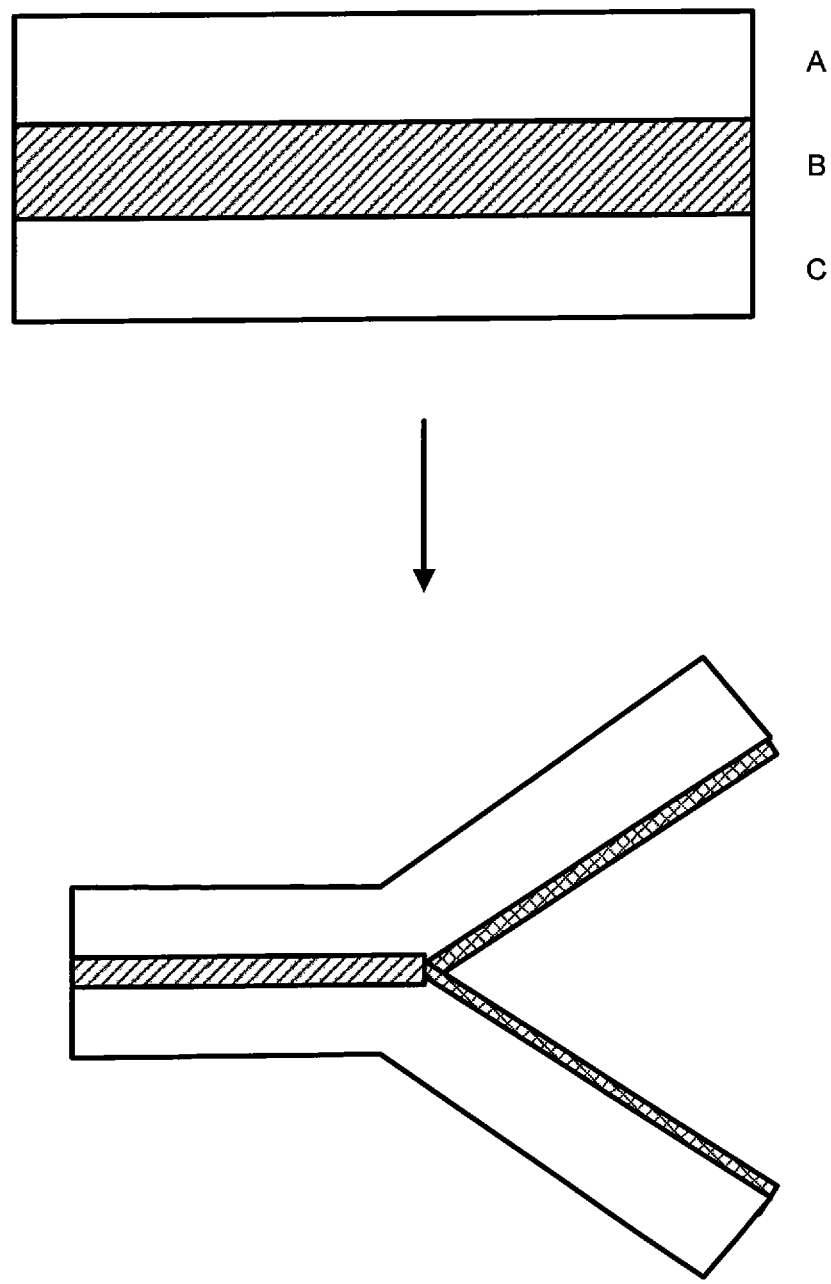
FIG. 8 is a schematic depiction of a center-side method that uses three-layers.

FIG. 8 depicts a method of fabricating fine structures using a three-substrate system including substrate A, substrate B and substrate C. In this design, substrate B is used to construct fine structures. In one embodiment, substrate B is a thermoplastic polymer or thermoplastic polymer-based composite. Substrate B may be a film or a sheet. To ensure the peeling will happen within substrate B, the adhesion force at the interfaces $F_{AB}$, $F_{BC}$ and the intermolecular attractive of substrate A and substrate C are selected to be larger than the intermolecular attractive force of substrate B. Techniques such as chemical etching, plasma treatment and roughing, as well as using high pressure during bonding can be used to improve the interfacial adhesion under certain conditions. This method may be especially useful when both substrate A and substrate C require a coating made from substrate B with fine structures on the surface.

Figure 9:
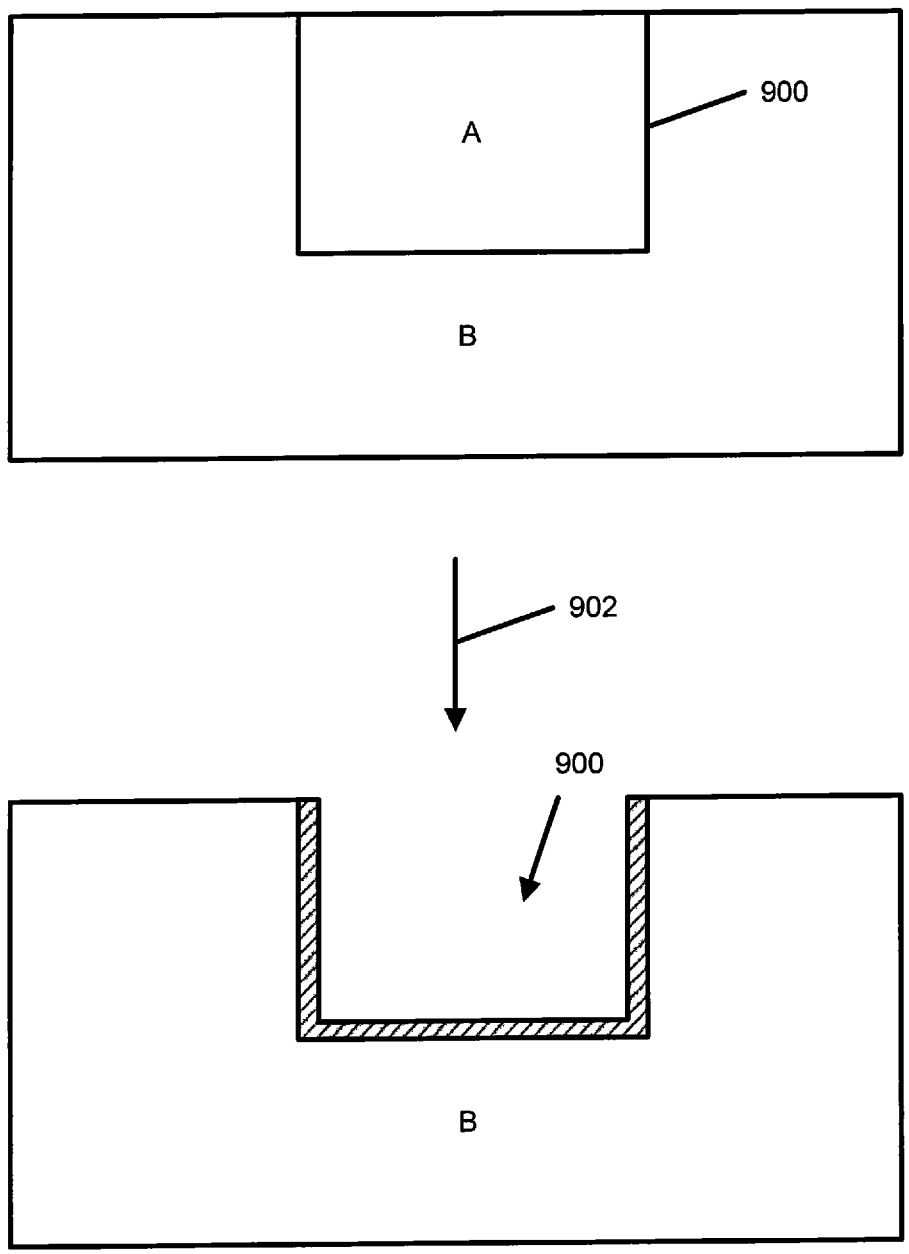
FIG. 9 is a schematic depiction of a center-side method that forms a fabricated surface in a channel.

FIG. 9 depicts a method of fabricating fine structures onto walls of a channel. Substrate A can be used to construct fine structures and, in some embodiments, is a thermoplastic polymer or thermoplastic polymer-based composite. A channel 900 can be pre-made into substrate B by molding or cutting technologies. Substrate A can be applied into the channel by casting or extruding to make a good bond to a surface of the channel 900. After cooling, substrate A can be peeled off from the channel in step 902 to generate fine structures on the surface of the channel 900. In one embodiment, the surface of the channel 900 is tapered so that substrate A can be removed without excessive force. In one embodiment, substrate A is a pre-formed polymer wire with a small diameter. In such an embodiment, the wire may be pulled out of the channel 900 even when the majority of the rod is embedded in substrate A. This process is facilitated when the polymer rod is stretched (or shrunk) during peeling.

In one embodiment, the resulting material consists of only the thermoplastic material. It is not necessary to embed nanoparticles or add any polymer or chemical to the thermoplastic material surface. The polymer to which the thermoplastic material is adhered may not necessarily be transferred to the resulting material.

In one embodiment, the thermoplastic material is a thermoplastic polymer with no significant crosslink density (e.g. the crosslink density is less than 1%). The peeling substrate can be either a thermoplastic or thermoset (e.g. crosslinked) polymer. At least one of the polymer substrates is sufficiently thin or flexible to permit peeling. The nanoscale features on the resulting material are monolithic with the underlying thermoplastic substrate. The nanoscale features are not adhered or applied to the substrate. The nanoscale features on the resulting material may comprise nano-fibrils that are less than 150 nm in diameter and frequently less than or equal to 50 nm in diameter.

In one embodiment, the process is controlled such that a sufficient density of adhesive bonds are formed between the first substrate and the second (peeling) substrate. If too high a density of adhesive bonds is formed, the peeling strength will be too large and the nanoscale features formed on the first substrate will be too dense and/or short. If the density of adhesive bonds is too low, then the nanoscale features are too far apart. By limiting the points of adhesion between the first substrate and the peeling substrate, the proper density and aspect ratio of nanoscale features can be formed to yield an antireflective surface (when a transparent polymer first substrate is used) and excellent superhydrophobic properties.

Various techniques can be used to control the adhesive bond density between first substrate and peeling substrate including: texturizing at least one of the film surfaces, printing or applying a release material (e.g. a material that does not adhere to the first substrate) in an ordered or random pattern, applying nanoparticles in an ordered or random pattern. Various process parameters can be used to control the adhesive bond density between the first substrate and peeling substrate including: lamination pressure, lamination temperature and lamination time.

Selection of the peeling substrate is important. The first substrate should adhere to the peeling substrate; however significant interdiffusion between polymer chains of the first substrate and polymer chains of the peeling substrate should be prevented. One approach is to use a peeling substrate with a crystalline melting point higher than the first substrate. Another approach is to use an amorphous polymer as the peeling substrate that has a Tg higher than the melt temperature of the first substrate. A third approach is to use a peeling substrate composed of a co-polymer or polymer blend in which one component is able to adhere to the first substrate whereas the other component does not adhere to the first substrate.

The disclosed method provides free-standing films whereas traditional polymer/sol-gel coating cannot exist as free-standing films. Many of these traditional polymer/sol-gel coatings require treatment with a fluoroalkylsilane to render the surface superhydrophobic. This fluoroalkylsilane surface treatment can be easily oxidized or washed away. In contrast, the disclosed method creates a superhydrophobic surface that is inherently hydrophobic and does not require a fluorosilane surface treatment.

Traditional methods often apply fine structures to the surface, or create the fine structures by etching away from the surface. In the disclosed method, the structures are created by pulling polymer molecules out of the surface. No chemicals are added to the polymer substrate (adhesive or build-up processes), nor is the polymer substrate treated with any liquid chemicals (as used for etching processes).

The disclosed method fabricates anti-reflective superhydrophobic (AR-SH) films using a low-cost process. Fine scale structures, on the order of 150 nm, were formed on the outermost surface creating a gradient-index layer that is superhydrophobic; water droplets are nearly spherical (contact angle of 160°) and slip-off when the surface is tilted less than 10°. The materials are inherently UV stable. Samples exhibited greater than 94% transmission and anti-reflective properties are maintained over a wide range of incident angles.

Other applications for transparent, anti-reflective and superhydrophobic surfaces include window glazing, especially for commercial buildings. Windows for various cameras, such as those used on automobiles or for surveillance, would also benefit from the disclosed method.

Both antireflectivity and superhydrophobicity use precise control of surface nanostructures. A continuous change in the density of the surface nanostructures forms a gradient refractive index between the solid surface and the air. This gradient minimizes the reflections that would occur at the abrupt interface between air and solid glass. The disclosed superhydrophobicity comprises hierarchical nanostructures that are made from hydrophobic materials. Liquid water rests on the outermost tips of these nanostructures such that the droplet is surrounded by air, with less than 1% of the liquid in contact with the solid surface. Water is highly mobile on a superhydrophobic surface and can slip off at low tilt angles. To maintain transparency, these nanostructures may be smaller than one-fourth of the wavelength of visible light (about 150 nm).

In some embodiments it may be desirable to crosslink the thermoplastic material after the superhydrophobic surface has been formed to enhance its thermal and/or mechanical properties.

Figure 10:
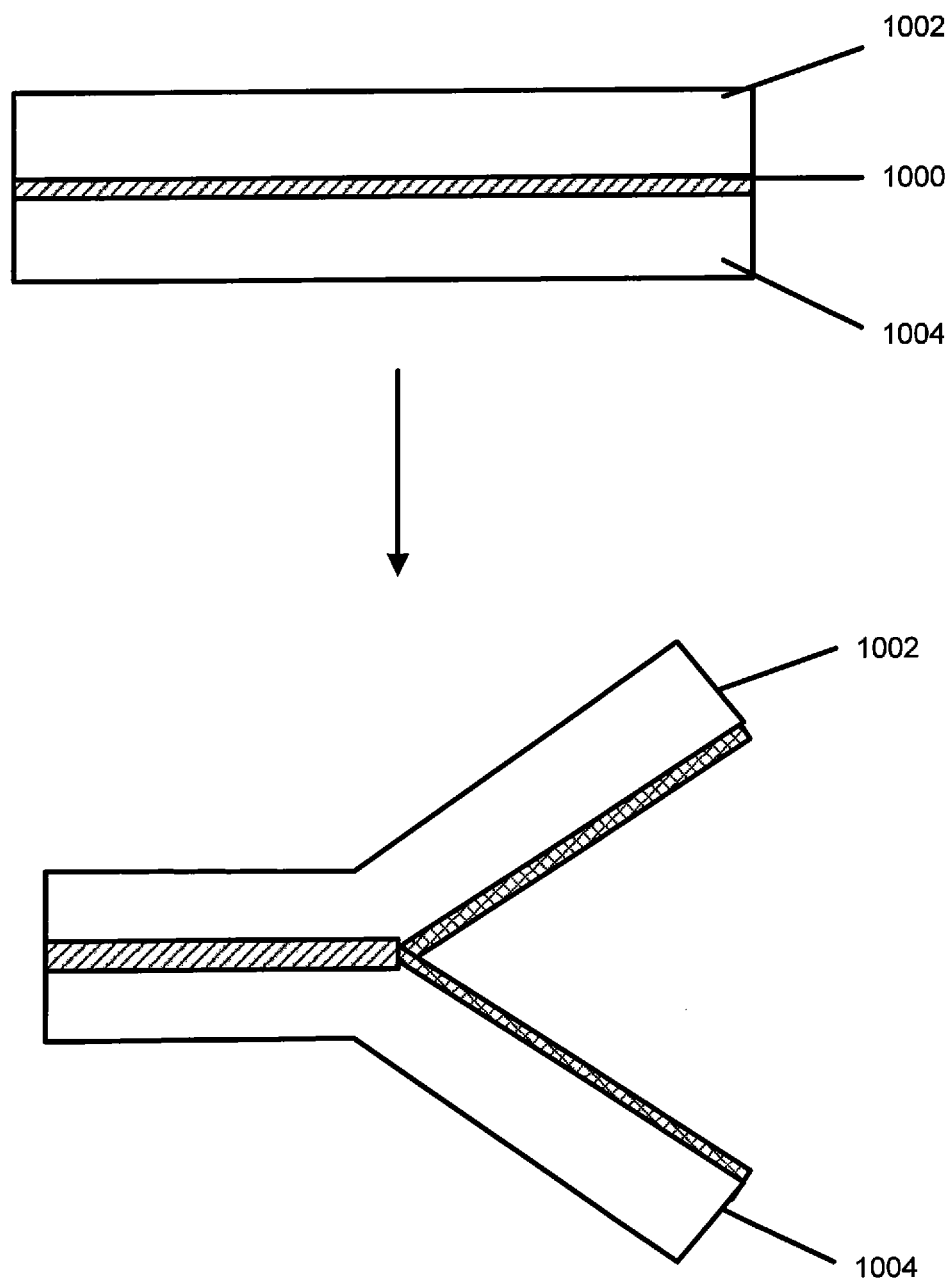
FIG. 10 is a schematic depiction of a center-side method that forms a fabricated surface on ultra-high-molecular-weight polyethylene (UHMW PE)
Figure 11B:
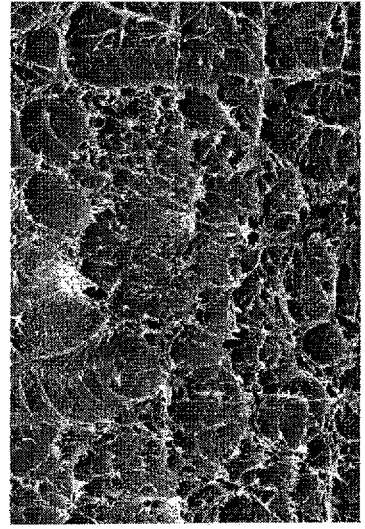
FIG. 11A to 11D are scanning electron microscope (SEM) images of a fabricated surface.
Figure 11D:
Figure 11A:
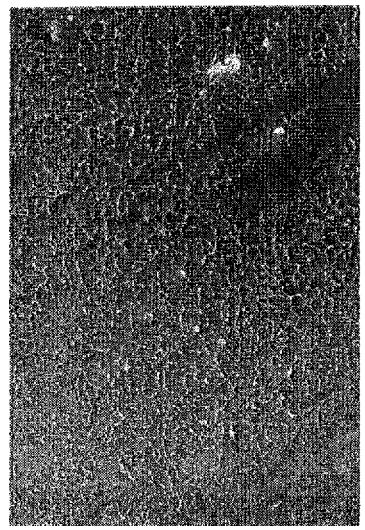
Figure 11C:
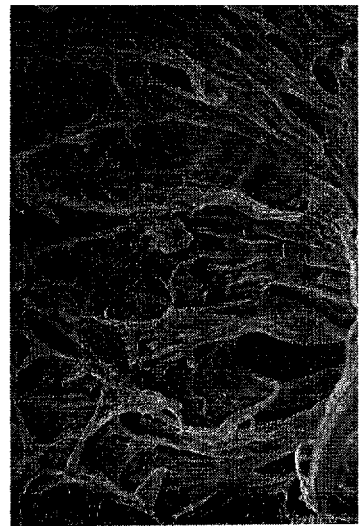

Example 1. Micro/Nanofabricating on Ultra-High-Molecular-Weight Polyethylene to Obtain Superhydrophobicity and Self-Cleaning Properties FIG. 10 depicts a method for fabricating fine structures on ultra-high-molecular-weight polyethylene (UHMW PE) by peeling. A superhydrophobic surface was successfully made by peeling LDPE from UHMW PE. The LDPE has a molecular weight of 28,000 to 280,000, while the UHMWPE has a molecular weight of 3,000,000 to 6,000,000. The LDPE with lower molecular weight was easier to be stretched and separated compared to the UHMW PE. After peeling, LDPE with lower molecular weight was the main material to form the nanostructures onto the UHMW PE surface. One substrate of low-density polyethylene (LDPE) 1000 was put in between two substrates 1002 and 1004 of UHMW PE and bonded together by roll-lamination at 193° C. at a speed of 1-3 mm/s by a laminator (Ledco, Professor-27"). The thickness of the LDPE substrate 1000 was about 50 microns and the thickness of the UHMW PE substrates 1004 and 1004 was about 500 microns each. The substrates were cleaned by soap, rinsed with distilled water and dried in oven at 60° C. before lamination. After lamination and cooling to room temperature (about 25° C.), the three layers of materials were strongly bonded together. Then the materials were peeled apart from each other by hand at room temperature. In one embodiment, the peeling angle is in range of 90-180°, and the peeling speed is in range of 3 to 25 mm per second. Because the interfacial adhesive strength between UHMW PE substrates 1002 and 1004 and LDPE substrate 1000 and the intra-molecular attractive forces within UHMW PE substrate 1002 and 1004 are stronger than the intra-molecular attractive forces within LDPE substrate 1000, the peeling fracture occurred within the LDPE substrate 1000.

The scanning electron microscope (SEM) images of the fine structures on the UHMW PE substrate formed after peeling are shown in FIGS. 11A-11D from low to high magnifications. Because LDPE is a thermoplastic material having a good plasticity and relatively low crystallinity at room temperature, the fracture surface formed by peeling shows typical plastic characteristics. The nest-like fine structures that can be easily distinguished in the low-magnification SEM images as shown in FIG. 10A and FIG. 10B. These fine structures mainly range from 1 micrometer to 10 micrometers. From the high-magnification SEM images shown in FIG. 11C and FIG. 11D, it can be seen that the nest-like fine structures are composed of nanofibers and nanoparticles with the nanofibers occupying more than 85% of the area. The diameter of the nanofibers is about 50 nm while the diameter of nanoparticles is about 25 nm. The length of the nanofibers is in the range of 300 nm to 5 micrometers. The aspect ratio of the nanostructures ranged from 1 to 100. Both the nanoparticles and the nanofibers are formed by the realignment of the LDPE molecules during peeling and stretching. Such a surface possesses excellent superhydrophobicity as the water contact angle reaches above 150 and the slip angle is lower than 10°.

Figure 12:
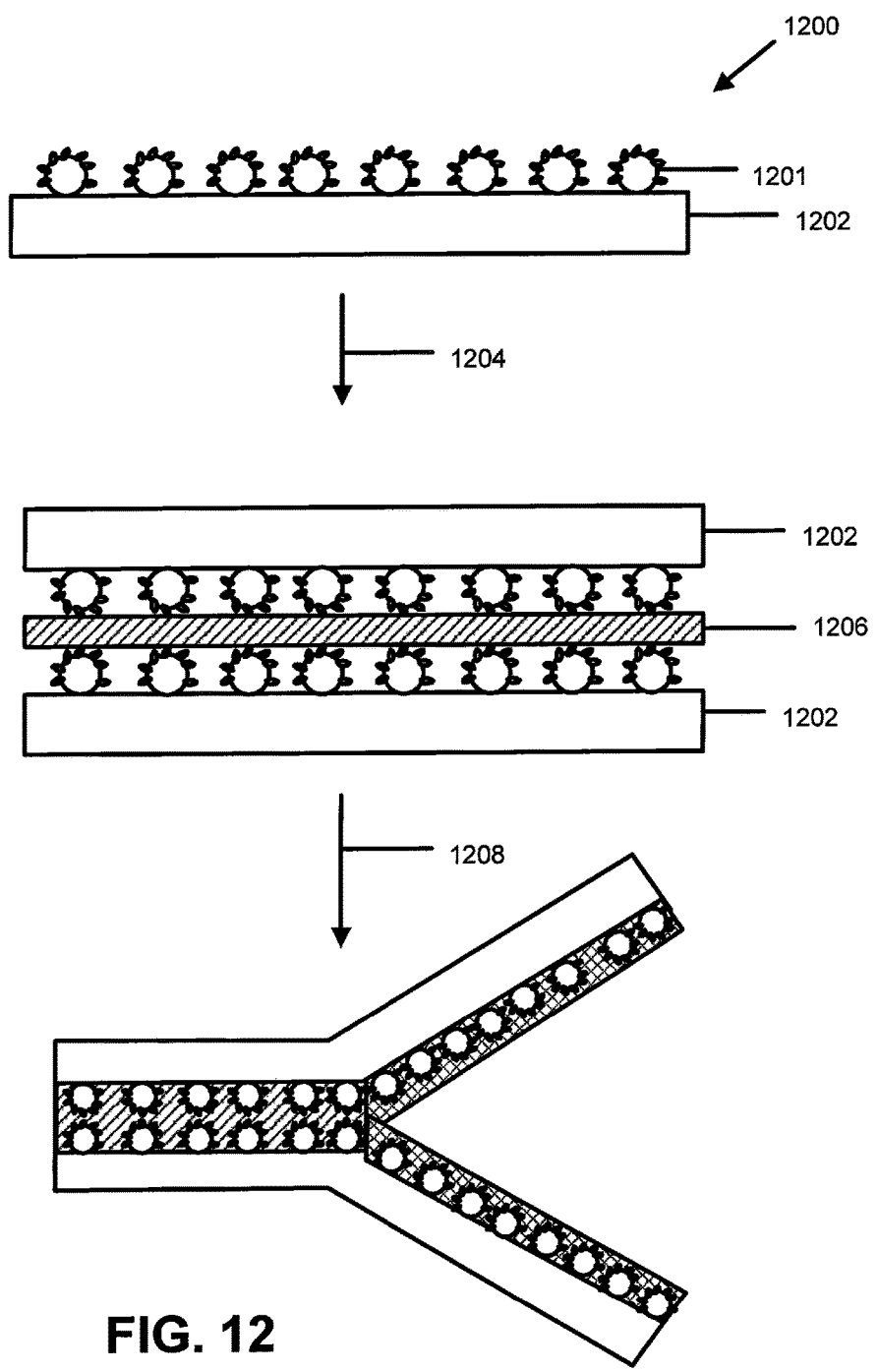
FIG. 12 is a schematic depiction of a center-side method that forms a fabricated surface on patterned high-density polyethylene (HDPE)

Example 2. Micro/Nanofabricating on Patterned High-Density Polyethylene to Obtain Superhydrophobicity and Self-Cleaning Properties FIG. 12 schematically depicts a method 1200 for fabricating fine structures on patterned high-density polyethylene (HDPE) 1202 by peeling. Local geometry of HDPE was changed with a mesh template and nanoparticles to make the superhydrophobic surfaces. This local geometry can reduce the $F_{AB}$ at the interface as well as reducing the peeling forces. This design can enable the fabricated superhydrophobic surface to have multi-scale roughness which is beneficial for mechanical durability. Step 1204 uses lamination to impart a texture to the HDPE 1202 with a 100×100 stainless steel mesh 1201 and hydrophobic nanoparticles (CAB-O-SIL, TS-530). Detailed information about texturing the HDPE can be found in International WO/2012/118805, the content of which is hereby incorporated by reference. The thickness of the HDPE substrate 1202 before texturing was about 180 micrometers. One substrate of LDPE 1206 with a thickness of 50 micrometers was placed in between two substrates of the textured HDPE 1202. This "ABA" stack was bonded using a roll laminator (Ledco, Professor-27" at 193° C. at a speed of 1-3 mm/s) using two layers of PET film with a thickness of 1 mil as release layers during lamination. The substrates were cleaned by soap, rinsed with distilled water and dried in oven at 60° C. before lamination. During lamination, the LDPE substrate 1206 flowed into the gaps between the two textured HDPE substrate 1202 because the LDPE substrate 1206 has lower viscosity than the HDPE substrate 1202. The temperature, pressure and lamination speed was controlled to enable the LDPE substrate to flow but to prevent/minimize any flow in the HDPE substrate. After lamination and cooling to room temperature, the three substrates were strongly bonded together. In step 1208 the substrates were peeled apart from each other by hand at room temperature. Because the surfaces of the HDPE was textured and coated with nanoparticles, the adhesion strength at the interface between textured HDPE and LDPE was the weak compared to the intra-molecular attractive forces between the HDPE and LDPE films. As a result, the fracture tended to occur and propagate at the interface between HDPE and LDPE.

SEM images of the fine structures on textured HDPE formed during peeling are shown in FIGS. 13A-13D. The very coarse textured structures, created by the 100×100 mesh template, can be clearly seen in FIG. 13A. As shown in FIGS. 13B-13C, many fine structures were formed on the coarse structures. This fracture surface also shows typical plastic characteristics as many nanofibers were formed during peeling. The diameter of the nanofibers was also about 50 nm and the aspect ratio ranged from 1 to 20. The nanoparticles used to pattern the HDPE surface were covered and immobilized by the LDPE nanofibers. Most of the nanofibers tended to stand up, perpendicular to the plane of the HDPE substrate. This orientation demonstrates that the localized stretching direction during peeling could be affected by pre-patterning the interface. Such a surface possesses excellent superhydrophobicity as the water contact angle reaches above 150° and the slip angle is below 10°.

Figure 14:
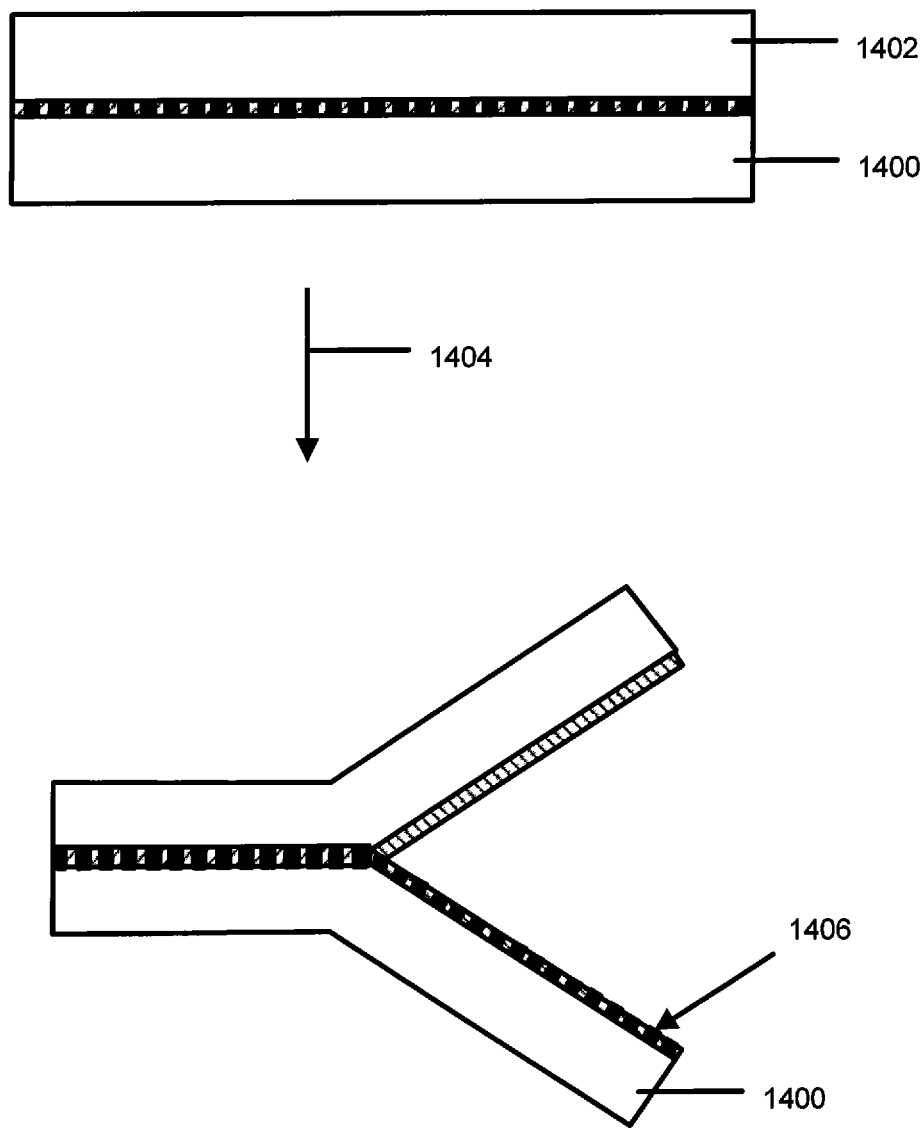
FIG. 14 is a schematic depiction of a center-side method that forms a fabricated surface of fluorinated ethylene propylene (FEP)
Figure 15:
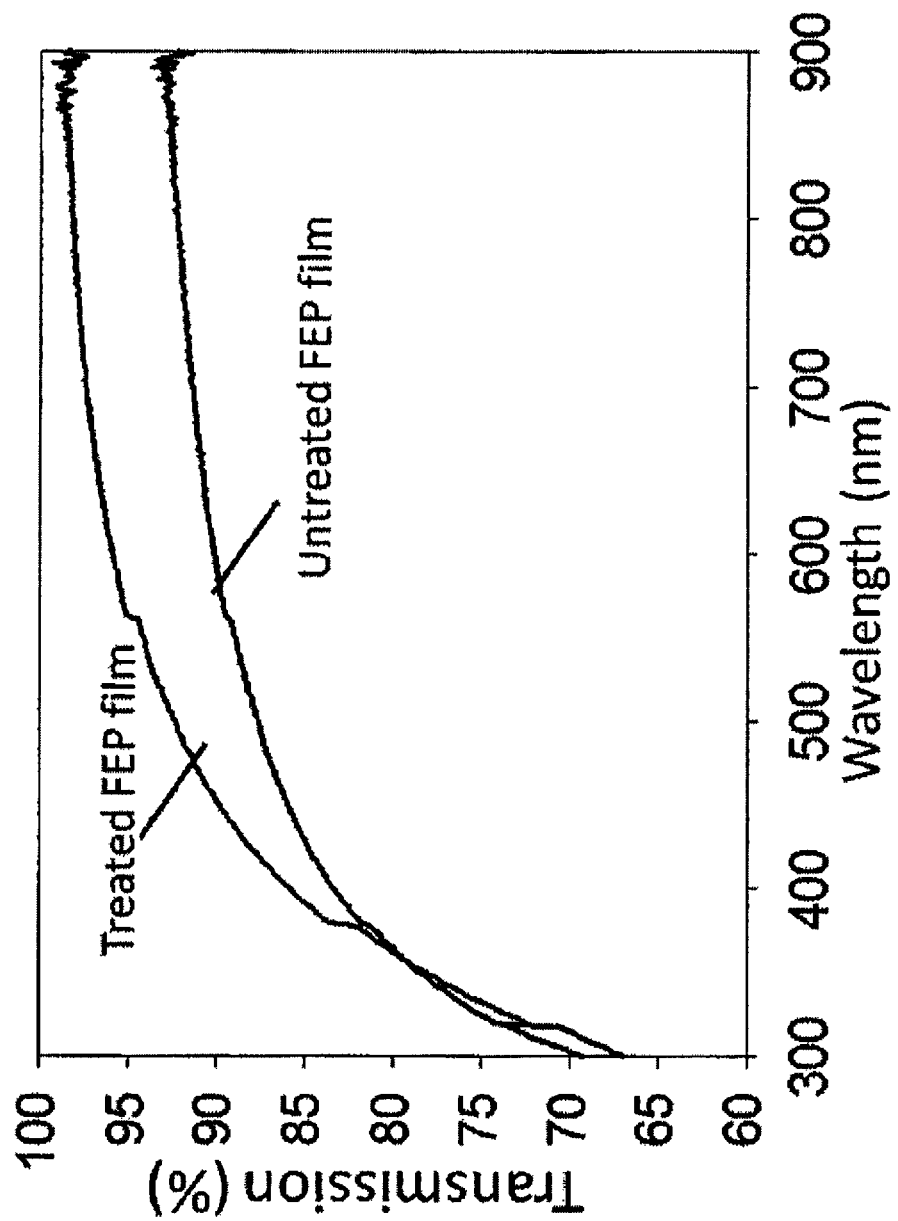
FIG. 15 is a graph depiction percent transmission as a function of wavelength for a fabricated surface on FEP.

Example 3. Fabrication of Fine Structures on Fluorinated Ethylene Propylene (FEP) Substrates Creating a Transparent, Anti-Reflective and Superhydrophobic Material FEP with a melting point of 260° C. was used with PTFE films with a melting point of 326.8° C. Since the PTFE has a higher melting temperature of than FEP film, the FEP formed the nanostructures onto the PTFE film. Referring to FIG. 14, a FEP substrate 1400 with a thickness of 4 mil was used. The FEP substrate 1400 was bonded to a Polytetrafluoroethylene (PTFE) substrate 1402 under heat and pressure. Both the surfaces of the FEP substrate 1400 and the PTFE substrate 1402 were rendered very smooth for achieving high transparency as well as anti-reflectivity. The surface root mean square (RMS) roughness of the FEP substrate and the PTFE substrate were less than 5 nm. The PTFE substrate 1402 was coated with a layer of silica nanoparticles by dip-coating into a mixture of isopropanol, water and methanol containing 1% of silica nanoparticles (CAB-O-SIL, TS-530). The volume ratio of isopropanol, water and methanol was maintained as 0.63:0.27:0.09. The coated PTFE substrate 1402 was placed onto the FEP substrate 1400 and laminated between two stainless steel plates at 276.7° C., 20 psi for 15 min to generate sufficient adhesion between the PTFE substrate 1402 and the FEP substrate 1400. The stainless steel plates for applying pressure and heat were polished to be mirror-like smooth. Subsequently the resulting stacked material was cooled to room temperature and separated by peeling (step 1404). The fractured surface 1406 of the FEP substrate 1400 shows significant anti-reflectivity throughout the visible light wavelength spectrum as shown in FIG. 15. The resulting product has a higher light transmission than the untreated substrate. In one embodiment, the resulting product has at least 85% transmission from 400 nm to 800 nm. In another embodiment, the resulting product is at least 85% transmissive from 370 nm to 800 nm. The fractured surface 1406 also shows excellent superhydrophobicity. Water contact angle on the fractured surface 1406 is above 150° and the slip angle is below 10°.

Figure 16:
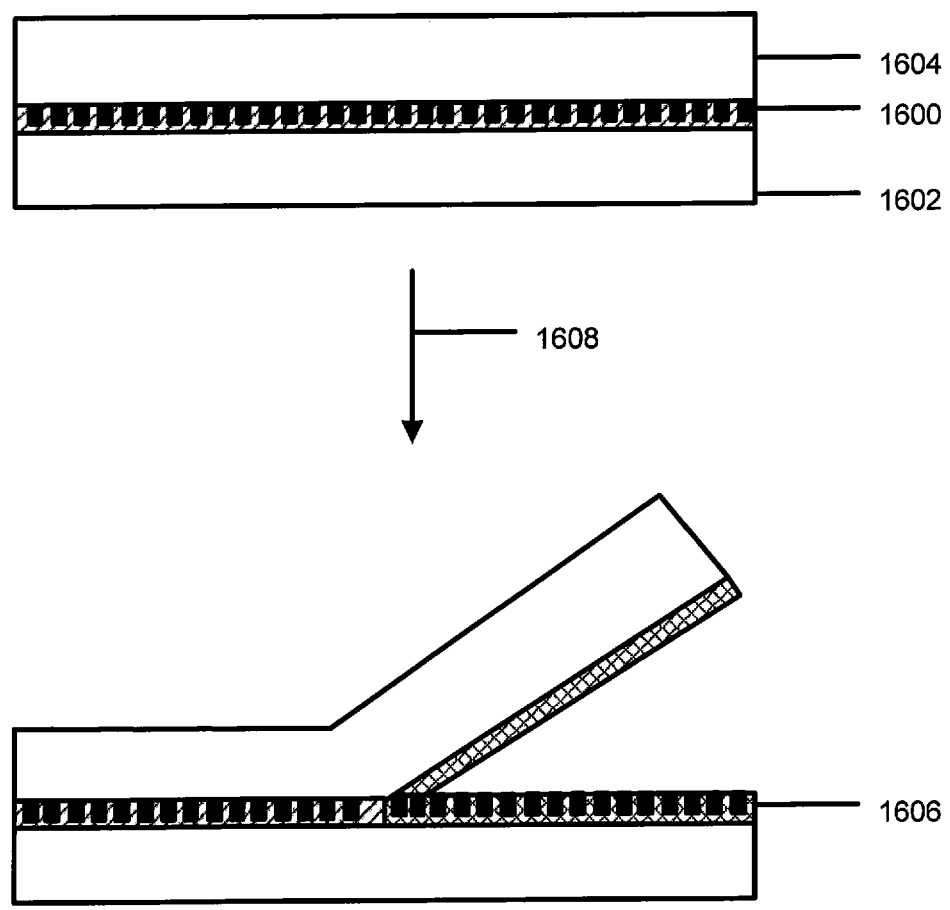
FIG. 16 is a schematic depiction of a center-side method that forms an antireflective and superhydrophobic surface on glass.

Example 4. Creating Antireflective and Superhydrophobic Surfaces on Glass by Bonding and Peeling FIG. 16 schematically depicts a method for creating antireflective and superhydrophobic surfaces on glass by bonding and peeling. In Example 4, flexible FEP film and PTFE film were applied onto a rigid glass substrate. Since the glass is much stiffer than the polymer film, the peeling occurs at the polymer-polymer or polymer-glass interfaces, and the flexible polymer materials is stretched to form the nanostructures onto the rigid side. A FEP substrate 1600 with a thickness of 1 mil was bonded to a glass substrate 1602 using a PTFE substrate 1604 as the outer layer. The glass substrate 1602 and the PTFE substrate 1604 were cleaned with soap and distilled water and dried before use.

Figure 17:
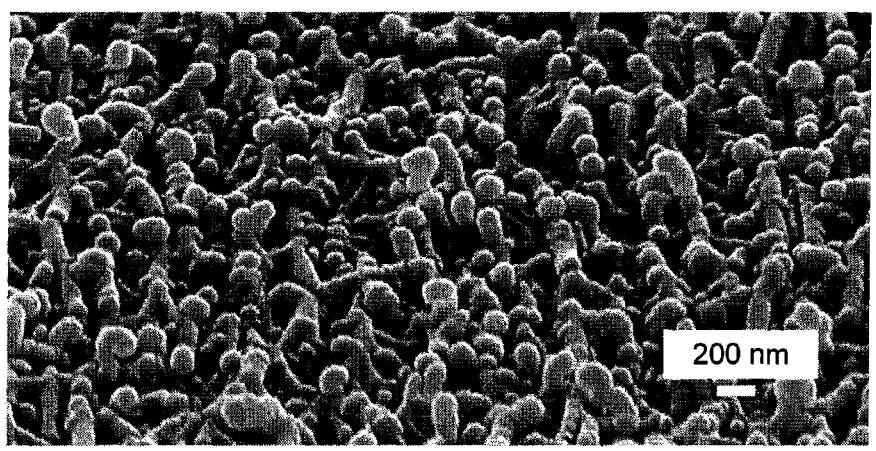
FIG. 17 is a SEM image of hierarchical nanostructures formed during the center-side method.

Similar to the description in Example 3, both FEP substrate 1600 and PTFE layer 1604 were rendered very smooth to achieve high transparency as well as anti-reflectivity. The surface root mean square (RMS) roughness of the FEP substrate 1600 and the PTFE substrate 1604 were less than 5 nm. The PTFE substrate 1604 was coated with a layer of silica nanoparticles by dip-coating into a mixture of isopropanol, water and methanol containing 1% of silica nanoparticles (CAB-O-SIL, TS-530). The volume ratio of isopropanol, water and methanol was maintained as 0.63:0.27:0.09. The FEP substrate 1600 was sandwiched between the coated PTFE substrate 1604 and the glass substrate 1602, and then laminated between two stainless steel plates at 276.7° C., 20 psi for 15 min to generate sufficient adhesion between the PTFE substrate 1604 and FEP substrate 1600 as well as strong adhesion between the FEP substrate 1600 and the glass substrate 1602. Subsequently the stack-up was cooled down to room temperature and separated by peeling (step 1608). Schematics and SEM images of the formed hierarchical nanostructures with gradient refractive index is shown in FIG. 17. The refractive index of the film varies from 1 (air) to 1.5 (glass). The fabricated surface 1606 on the glass side showed significant anti-reflectivity throughout the visible light wavelength spectrum. The fabricated surface also shows excellent superhydrophobicity. Water contact angle on the fabricated surface is above 150° and the slip angle is below 10°.

The peeling temperature has a significant effect on the surface nanostructures as well as the superhydrophobic and antireflectivity. The cooling rate affects the crystallinity of the films after lamination. Rapid cooling prevents the formation of large crystals. The films were rapidly cooled after lamination by either quenching or using an air knife as described in Examples 5 and 6, respectively.

Example 5. Controlling the Nanostructures by Changing Peeling Temperature for Making Free-Standing Superhydrophobic Films FEP film with a thickness of 5 mil and PTFE film with a thickness of 2 mil was used as first and second substrates. The PTFE film was placed onto the FEP film and laminated between two stainless steel plates at 276.7° C., 20 psi for 15 min to generate sufficient adhesion between the PTFE and FEP films. After the lamination, the FEP-PTFE stacked material was quenched at −20° C. The surface was quenched to minimize the size of crystallites in the FEP layer. The peeling was conducted at a specific temperature over the range from −195° C. to 271° C. The surface nanostructures as well as the properties changed significantly depending on the peeling temperature as shown in FIGS. 18A-18F and Table 1.

TABLE 1

The properties of surfaces peeled at different temperature.

| Sample | Peeling temperature (° C.) | Superhydrophobic (CA > 150° C., SA < 10° C.) |
|---|---|---|
| 1 | 271 | No |
| 2 | 254 | No |
| 3 | 232 | No |
| 4 | 216 | Yes |
| 5 | 177 | Yes |
| 6 | 121 | Yes |
| 7 | 25 | Yes |
| 8 | −20 | No |
| 9 | −195 | No |

The surface after peeling at −195° C. (see FIG. 18A) was very smooth and dense. Ball-shaped particles started to show up on the surface peeling at −20° C. (see FIG. 18B). Such surfaces were still relatively smooth as the aspect ratio (length to diameter) of those particles is less than 1:1 and they were packed densely in one plane. As a result, the surface did not show superhydrophobic properties. When the peeling temperature was increased to 25° C. (FIG. 18C), nanofibers directing outward from the base with a ball-shaped end were formed. The aspect ratio of such nanofibers was in between 1:1 and 20:1. The aspect ratio changed slowly when the peeling temperature increased from 20° C. to 216° C. (FIG. 18D). Such surfaces composed of nanofibers possessed adequate roughness for obtaining superhydrophobic properties.

When the peeling temperature was increased to 254° C. (see FIG. 18E), the aspect ratio was significantly increased to be larger than 100:1 and the nanofibers were in alignment with each other in the direction of the peeling force, forming a dense surface. Such a surface did not show superhydrophobic properties. When the peeling temperature was 271° C. (FIG. 18F), which was higher than the melting point of the FEP film, no nanofibers can be formed.

Example 6. Controlling the Nanostructures by Changing the Peeling Temperature for Making Antireflective Surfaces on Glass A process for making antireflective and superhydrophobic surfaces on glass by bonding and peeling is described in this example. A FEP resin sheet with a thickness 40 mil was laminated onto a glass substrate (1 mm thick) by heating at 310° C. for 30 min under pressure. The FEP-Glass stacked material was cooled rapidly to room temperature under an air knife (operating at 90 psi). Subsequently, the stack-up was heated to temperatures ranging from 152° C. to 163° C. and peeled apart.

Figure 20:
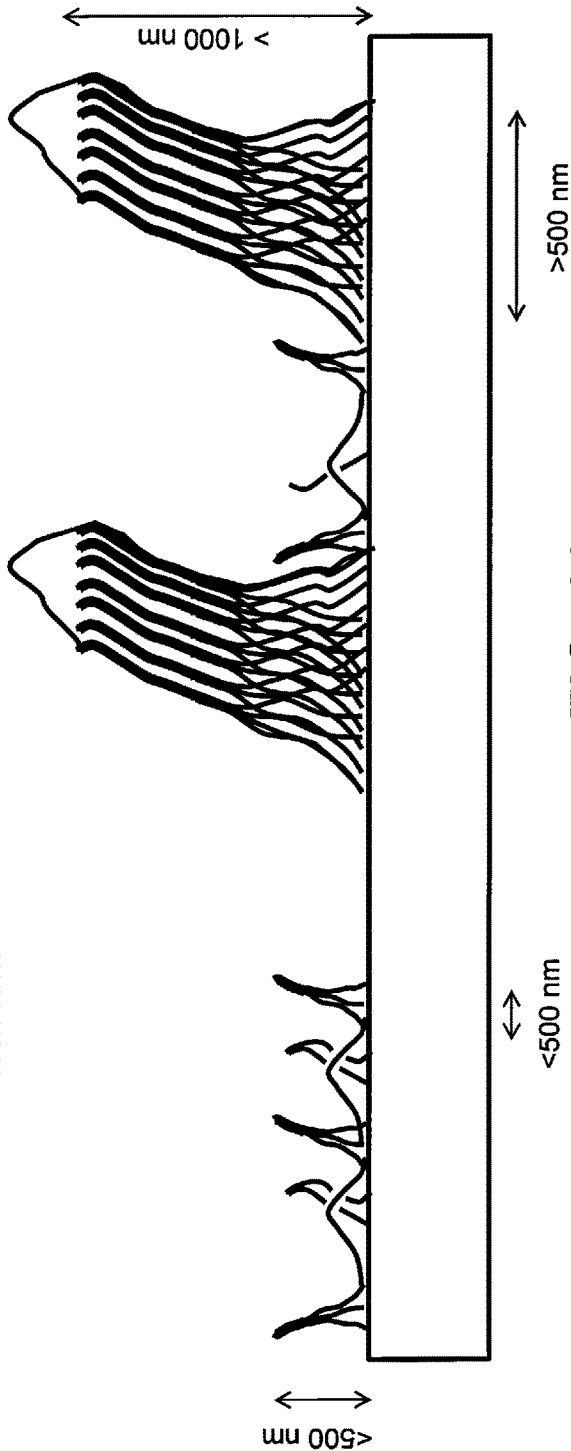
FIG. 20 schematically depicts desirable filament morphology to achieve good anti-reflective properties (left) or superhydrophobic properties (right)
Figure 21:
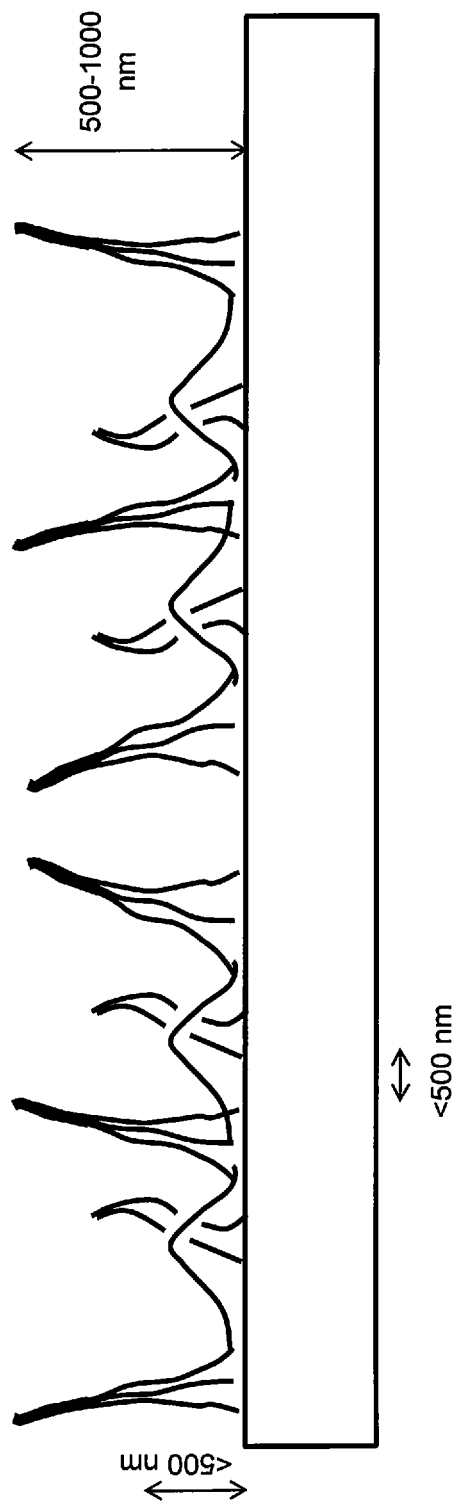
FIG. 21 schematically depicts desirable filament morphology to achieve both good anti-reflective properties and superhydrophobic properties.

The surface nanostructures formed onto the glass after peeling are shown in FIGS. 19A-19D. When the peeling temperature was 152° C. (see FIGS. 19A and 19B), the surface was mainly composed of single nanofibers with entangled joints. The nanofibers directing from the base to outside of the surface had a ball-shaped end. The surface displayed moderate superhydrophobicity (contact angle 145°, sliding angle of 20°) and very good anti-reflective properties. Without wishing to be bound to any particular theory, superhydrophobicity may be moderate because the filaments are short (about 500 nm) and spaced relatively far apart from each other (about 500 nm). The spaces between filaments (e.g. "pores") is between 500 nm and 1000 nm). When the peeling temperature increased to 163° C. (see FIGS. 19C and 19D), the nanofibers started to aggregate to form lamellar structures during peeling. The lamellar structures can be larger than 1 µm, which can increase the light scattering, and thus reduce the light transmission. The direction of such lamellar structures indicated the angle of the peeling force. The surface displayed good superhydrophobicity (contact angle greater than 150°, sliding angle of less than 5°), good transparency but no anti-reflectivity. Without wishing to be bound to any particular theory, the lack of anti-reflectivity may be due to the yarns or lamella of filaments. The disclosed method permits good anti-reflective properties and good superhydrophobic properties to be combined into a single surface. Good anti-reflective properties are believed to be provided by filaments that are less than 150 nm in diameter and do not merge together. Good superhydrophobic properties are believed to be provided by filaments that are taller than 500 nm or less than 500 nm apart (a pore size of less than 500 nm). Shorter filaments (e.g. nanofibers) can be superhydrophobic if they are closer together. If the filaments are further apart then they should be taller to adjust for the increased more size. FIG. 20 and FIG. 21 schematically depicts this theory of operation.

Figure 22:
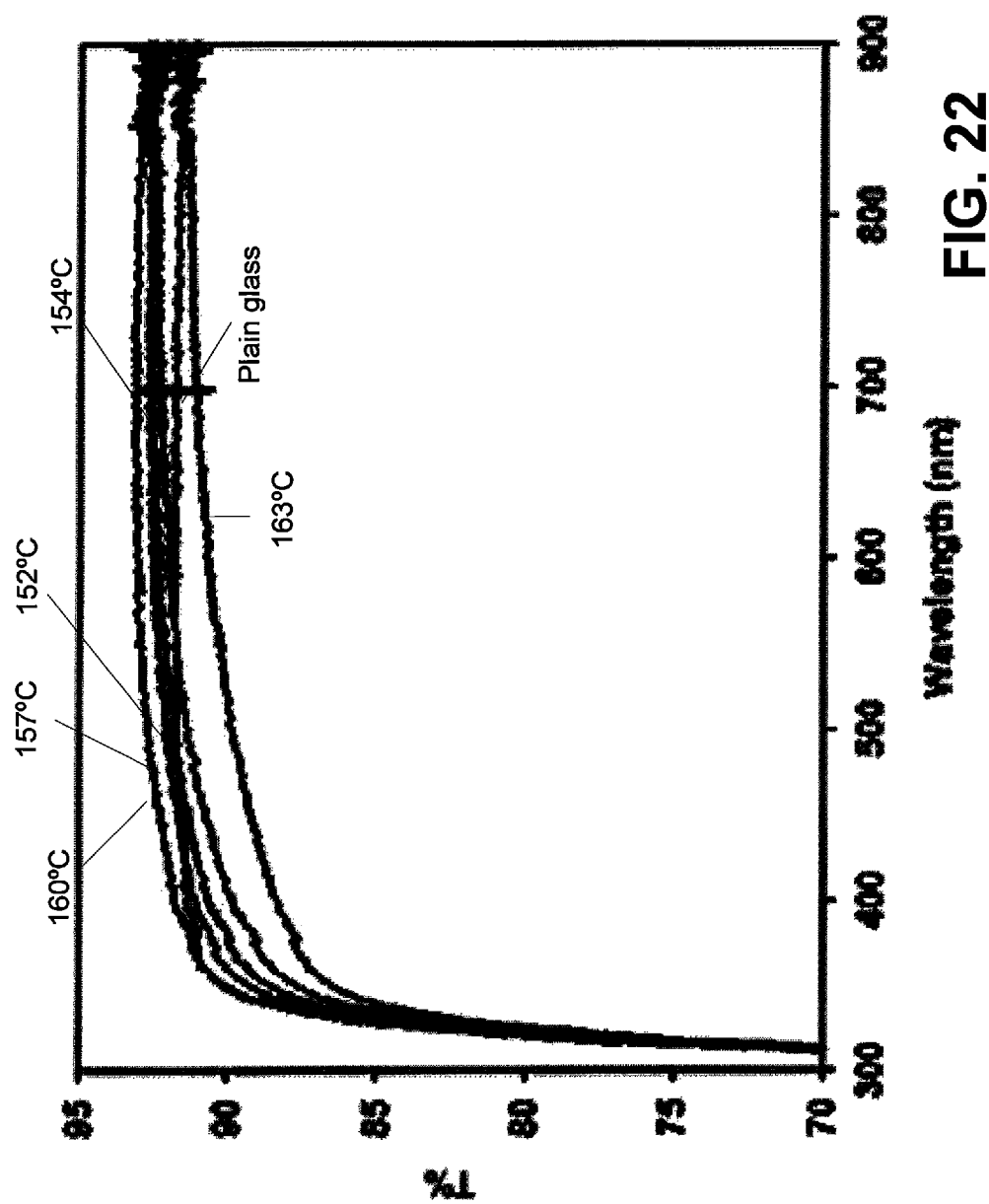
FIG. 22 is a graph of light transmission as a function of wavelength for a exemplary surface.

The light transmission of the samples of the transparent samples is shown in FIG. 22. This data shows that the sample peeled at 163° C. had a lower light transmission than the untreated glass, and the samples peeled at 152° C., 154° C., and 157° C. were only partially antireflective over this range. The sample peeled at 160° C. showed the best anti-reflective properties with a light transmission higher than the untreated glass over this range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for forming a superhydrophobic surface, the method comprising steps of:
   laminating a first surface of a first substrate to a second surface of a second substrate to form a stacked material, wherein the first surface comprises a semi-crystalline thermoplastic material having a first melting point and a crosslink density of less than 1%; and
   peeling the first substrate and the second substrate apart to form a fracture line, the fracture line within the first substrate thereby transferring a portion of the first substrate to the second substrate and providing a superhydrophobic surface on the second substrate with a water contact angle greater than 130°.

2. The method as recited in claim 1, wherein the step of peeling occurs at a temperature above 50° C. and below the melting point of the thermoplastic material.

3. The method as recited in claim 1, wherein a second superhydrophobic surface is disposed on the first substrate after the step of peeling.

4. The method as recited in claim 1, wherein the second substrate is a rigid substrate with a Young's modulus of at least 1 GPa.

5. The method as recited in claim 1, wherein the thermoplastic material is a fluoropolymer.

6. The method as recited in claim 1, further comprising depositing nanoparticles on at least one of the first surface and the second surface prior to the step of laminating.

7. The method as recited in claim 1, wherein the first substrate comprises a first fluoropolymer and the second substrate comprises a second fluoropolymer, wherein the first fluoropolymer and the second fluoropolymer are different.

8. The method as recited in claim 1, the method further comprising:
bonding a third surface of a third substrate to a fourth surface of the first substrate, wherein the fourth surface comprises thermoplastic material;
peeling the third substrate and the first substrate apart to form a second fracture line, the second fracture line providing a second superhydrophobic surface having a second water contact angle greater than 130°.

9. The method as recited in claim 1, wherein the superhydrophobic surface comprises a plurality of filaments with diameters less than 150 nm, lengths of less than 1500 nm and are spaced apart from one another by a pore spacing of less than 500 nm such that the superhydrophobic surface also has anti-reflective properties.

10. The method as recited in claim 1, wherein the superhydrophobic surface is nanoparticle-free.

11. A method for forming a superhydrophobic surface, the method comprising steps of:
laminating a first surface of a first substrate to a second surface of a second substrate to form a stacked material, wherein the first surface comprises a semi-crystalline thermoplastic material having a first melting point and a crosslink density of less than 1%; and
peeling the first substrate and the second substrate apart to form a fracture line, the fracture line providing a superhydrophobic surface with a water contact angle greater than 130°.

12. The method as recited in claim 11, wherein the step of peeling occurs at a temperature above 25° C. and below the melting point of the semi-crystalline thermoplastic material.

13. The method as recited in claim 11, wherein the step of peeling forms structures on the superhydrophobic surface that have an aspect ratio (height:width) greater than 3:1.

14. The method as recited in claim 11, wherein the first surface is transparent and has a root mean square (RMS) roughness of less than 50 nm.

15. The method as recited in claim 11, wherein the second surface is transparent and has a root mean square (RMS) roughness of less than 50 nm.

16. The method as recited in claim 11, wherein the second substrate, after the peeling, is more transmissive than the second substrate prior to the laminating.

* * * * *